US012674302B2

(12) United States Patent
Hamamoto et al.

(10) Patent No.: US 12,674,302 B2
(45) Date of Patent: Jul. 7, 2026

(54) WORKING MACHINE

(71) Applicant: KUBOTA CORPORATION, Osaka (JP)

(72) Inventors: Ryota Hamamoto, Osaka (JP); Yuji Fukuda, Osaka (JP); Tomoyuki Noguchi, Osaka (JP); Kohei Nagao, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 489 days.

(21) Appl. No.: 18/131,423

(22) Filed: Apr. 6, 2023

(65) Prior Publication Data

US 2024/0337092 A1 Oct. 10, 2024

(51) Int. Cl.

| | |
|---|---|
| ***E02F 9/22*** | (2006.01) |
| ***E02F 3/96*** | (2006.01) |
| ***E02F 9/20*** | (2006.01) |
| ***E02F 9/26*** | (2006.01) |
| ***F15B 15/20*** | (2006.01) |
| ***F15B 19/00*** | (2006.01) |

(52) U.S. Cl.

CPC .............. *E02F 9/2228* (2013.01); *E02F 3/96* (2013.01); *E02F 9/2004* (2013.01); *E02F 9/2025* (2013.01); *E02F 9/2267* (2013.01); *E02F 9/26* (2013.01); *F15B 15/20* (2013.01); *F15B 19/00* (2013.01); *E02F 9/2285* (2013.01); *E02F 9/2292* (2013.01); *E02F 9/2296* (2013.01); *F15B 2211/426* (2013.01)

(58) Field of Classification Search

CPC ......... E02F 9/2228; E02F 3/96; E02F 9/2004; E02F 9/2025; E02F 9/2267; E02F 9/26; E02F 9/2285; E02F 9/2292; E02F 9/2296; F15B 15/20; F15B 19/00; F15B 2211/426; F15B 19/002; F15B 21/087; F15B 2211/3116; F15B 2211/327; F15B 2211/6313; F15B 2211/7058; F15B 2211/78; F15B 2211/851; F15B 2211/6346; F15B 2211/75; F15B 2211/755; F15B 2211/853

See application file for complete search history.

(56) References Cited

U.S. PATENT DOCUMENTS

| | | | | |
|---|---|---|---|---|
| 2001/0032031 | A1* | 10/2001 | Ufheil | E02F 9/2228 700/169 |
| 2020/0048868 | A1* | 2/2020 | Nishimoto | E02F 9/2228 |
| 2024/0272638 | A1* | 8/2024 | Forcash | G05D 1/0223 |

FOREIGN PATENT DOCUMENTS

| | | | | |
|---|---|---|---|---|
| JP | 2020-026819 A | | 2/2020 | |
| WO | WO-2024091155 A1 | * | 5/2024 | E02F 9/205 |

* cited by examiner

*Primary Examiner* — Anne Marie Antonucci

(74) *Attorney, Agent, or Firm* — Greenblum & Bernstein, P.L.C.

(57) ABSTRACT

A working machine includes a controller to: select one of pieces of operation characteristics information corresponding to respective work attachments stored in a memory that corresponds to a work attachment attached to an attachment mount portion and fluidly connected to a hydraulic fluid port; and control, based on the selected one of the pieces of operation characteristics information, the speed of switching of a work-attachment-drive control valve when starting the work attachment and/or when stopping the work attachment.

11 Claims, 15 Drawing Sheets

Di Da PL Dp PU Dm Dm2 Dm1 DA

| List of attachment information | | | | | | | | |
|---|---|---|---|---|---|---|---|---|
| | Identification information | Hydraulic pressure characteristics information (hydrauilc pressure gauge information) | | | Operation characteristics information (switching speed information) | | | |
| | Type of attachment | AUX | Minimum proper hydraulic pressure | Maximum proper hydraulic pressure | Flow mode | Operation at startup | Operation at stopping | |
| DA1 | AUX default | Note | PL1 | PU1 | Normal | Quick start | Quick stop | |
| | | | | | High | Quick start | Slow stop | |
| DA2 | Bucket | No | – | – | Normal | – | – | |
| | | | | | High | – | – | |
| DA3 | Sweeper | Yes | PL2 | PU2 | Normal | Quick start | Slow stop | |
| | | | | | High | Quick start | Slow stop | |
| DA4 | Auger | Yes | PL3 | PU3 | Normal | Quick start | Quick stop | |
| | | | | | High | Quick start | Quick stop | |
| DA5 | Rake | Yes | PL4 | PU4 | Normal | Slow start | Slow stop | |
| | | | | | High | Slow start | Slow stop | |
| | | | | | | | | |
| | | | | | | | | |
| | | | | | | | | |
| | | | | | | | | |

Note: Hydraulic pressure gauge is turned on when AUX switch is on.
Hydraulic pressure gauge is turned off when AUX switch is off.

Fig.12

| Attachment information | | | | | | | | | |
|---|---|---|---|---|---|---|---|---|---|
| | Identification information | | | Hydraulic pressure characteristics information (hydraulic pressure gauge information) | | | Operation characteristics information (switching speed information) | | |
| | Type of attachment | Specification | Optional equipment | AUX | Minimum proper hydraulic pressure | Maximum proper hydrauilc pressure | Flow mode | Operation at startup | Operation at stopping |
| DA1 | Auger | | | Yes | PL3a | PU3a | Normal | Quick start | Quick stop |
| | | | | | | | High | Quick start | Quick stop |

DB Di Dp Dm Da PL PU Dm1 Dm2

Fig.13

WORKING MACHINE

BACKGROUND OF THE INVENTION

1. Field of the Invention

The present invention relates to working machines such as loaders including a skid-steer loader and a compact track loader.

2. Description of the Related Art

For example, a working machine such as a loader disclosed in JP2020-26819A includes an attachment mount portion (distal end portions of lift arms) to which a work attachment is attached. Some work attachments attached to the attachment mount portion include its own hydraulic actuator (AUX actuator). For example, an earth auger to drill into soil includes an AUX actuator which is a hydraulic motor to rotate the auger shaft.

For the purpose of supplying hydraulic fluid to the AUX actuator of such a work attachment, a working machine such as a loader includes hydraulic fluid port(s) (AUX port(s)) in the vicinity of the attachment mount portion such that: fluid pipe(s) such as hose(s) is/are run from the work attachment attached to the attachment mount portion to the AUX port(s); and hydraulic fluid is supplied from the working machine to the AUX actuator through the fluid pipes.

Furthermore, a working machine such as the disclosed loader as discussed above includes, in its hydraulic system: an AUX control valve switchable between a supply position in which hydraulic fluid is supplied to the AUX port(s) and a stop position in which the supply of hydraulic fluid to the AUX port(s) is stopped; and a high flow valve to increase the flow rate of hydraulic fluid supplied from the AUX control valve to the AUX actuator.

When the high flow valve is in a high flow position while the AUX control valve is in the supply position and hydraulic fluid is flowing between the AUX actuator and the AUX control valve, the high flow valve additionally discharges a hydraulic fluid flow, the flow merges with a hydraulic fluid flow between the AUX actuator and the AUX control valve, and the AUX actuator is supplied with hydraulic fluid at an increased flow rate. When the high flow valve is in a normal flow position, the high flow valve does not additionally discharge the hydraulic fluid flow, and the AUX actuator is supplied with hydraulic fluid at a normal flow rate.

The AUX control valve and the high flow valve each include a spool movable by pilot hydraulic pressure (pilot pressure). Respective solenoid valves controlled by a controller are provided to supply pilot pressure fluid to the AUX control valve and to supply pilot pressure fluid to the high flow valve.

In the hydraulic system, the controller controls the speed of movement of the spool when the AUX control valve is switched from the supply position to the stop position such that the speed is lower when the high flow valve is in the high flow position (such a state is hereinafter referred to as "high flow mode") than when the high flow valve is in the normal flow position (such a state is hereinafter referred to as "normal flow mode"). With this, the AUX actuator driven at high speed in the high flow mode is prevented from suddenly stopping and causing shock.

For example, with regard to a sweeper, the hydraulic motor thereof is driven in the high flow mode such that the rotary brush is quickly started and rotated at high speed, thus smoothly sweeping therein dust on the ground surface. On the contrary, when the rotation of the rotary brush in the high flow mode is to be stopped, the controller reduces the speed of movement of the spool from the supply position to the stop position of the AUX control valve, so that the rotary brush rotating at high speed gradually slows down and stops, thus reducing shock that would otherwise occur upon stopping.

However, some work actuators that can be quickly started and rotated at high speed in the high flow mode do not necessitate the foregoing reduction of the speed of movement of the spool when stopping, and rather undergo problems if the speed is reduced. For example, when an earth auger is pulled up from the ground after drilling into the ground, the earth auger is rotated reversely to throw off soil trapped between screw ridges of the auger shaft. In this regard, when the rotation is to be reversed, the speed of rotation is first reduced to stop. In so doing, if the speed is reduced gradually, a centrifugal force is not applied sufficiently to the soil and the soil cannot be thrown off well.

That is, it is desired that the speed of the AUX actuator is increased to start the AUX actuator and the speed of the AUX actuator is reduced to stop the AUX actuator according to the situation in which the work attachment is used.

It is also desired that, while the work attachment (AUX actuator) is being driven, an operator of the working machine can monitor the hydraulic pressure status of hydraulic fluid supplied from the AUX port(s) to the hydraulic actuator. To this end, a pressure gauge is attached to the work attachment in some cases. The pressure gauge is attached to the work attachment such that the pressure gauge is visually recognizable to the operator seated on the operator's seat of the working machine. However, because the pressure gauge is attached outside the cabin, the pressure gauge may be difficult to see under dusty conditions such as when cutting is performed with a brush cutter.

In view of the above, development has been made on the following technique: a hydraulic pressure gauge is displayed on an instrument panel within the cabin or the like of a working machine such as a loader such that the gauge is in a position and manner easily viewable to the operator seated on the operator's seat; and the hydraulic pressure gauge indicates the hydraulic pressure detected by a hydraulic pressure detector provided on the work attachment to detect the hydraulic pressure status of the AUX actuator. The hydraulic pressure gauge allows the operator to know the hydraulic pressure status of the work attachment (AUX actuator) in operation while controlling the movement of the work attachment.

However, there are different types of work attachments attachable to the working device (lift arms) of a loader, and the proper hydraulic pressure range may differ from one work attachment from another. For example, a hydraulic pressure within the proper hydraulic pressure range of one work attachment may be below the proper hydraulic pressure range of another work attachment or may be above the proper hydraulic pressure range of another work attachment.

On the contrary, the hydraulic pressure gauge presented to the operator in the cabin or the like of the working machine such as a loader is the same between different types of work attachments and does not correspond to different types of work attachments. Therefore, an operator needs to be experienced and trained to accurately know whether the hydraulic pressure of fluid supplied to the AUX actuator indicated on the hydraulic pressure gauge is really appropriate for the work attachment currently attached to the working machine. Under such circumstances, there is a demand for a working machine which makes it possible even for an unskilled operator to easily know the hydraulic pressure status of the AUX actuator (easily determine whether the hydraulic pressure indicated on the hydraulic pressure gauge is within the proper hydraulic pressure range of the work attachment or not).

SUMMARY OF THE INVENTION

In a first aspect, a working machine includes: an attachment mount portion including a hydraulic fluid port; a work-attachment-drive hydraulic circuit to supply hydraulic fluid to a work attachment attached to the attachment mount portion and fluidly connected to the hydraulic fluid port; a work-attachment-drive control valve to: control a flow rate of hydraulic fluid supplied via the work-attachment-drive hydraulic circuit to the work attachment; change a degree of opening of one or more ports thereof that are in communication with the work-attachment-drive hydraulic circuit by movement of a spool thereof; and change a speed of switching of the work-attachment-drive control valve, the speed of switching being a speed of movement of the spool; a memory to store pieces of operation characteristics information corresponding to respective work attachments each for use as the work attachment attached to the attachment mount portion and fluidly connected to the hydraulic fluid port, the pieces of operation characteristics information each including information relating to the speed of switching of the work-attachment-drive control valve; and a controller to select one of the pieces of operation characteristics information corresponding to the respective work attachments stored in the memory that corresponds to the work attachment attached to the attachment mount portion and fluidly connected to the hydraulic fluid port; and control, based on the selected one of the pieces of operation characteristics information, the speed of switching of the work-attachment-drive control valve when starting the work attachment and/or when stopping the work attachment.

The information relating to the speed of switching of the work-attachment-drive control valve may include information relating to selection of whether to cause the work attachment fluidly connected to the hydraulic fluid port to operate quickly or slowly when stopped.

The information relating to the speed of switching of the work-attachment-drive control valve may include information relating to selection of whether to cause the work attachment fluidly connected to the hydraulic fluid port to operate quickly or slowly when started.

The controller may be configured or programmed to switch a mode relating to a flow rate of hydraulic fluid flowing from the work-attachment-drive control valve to the hydraulic fluid port via the work-attachment-drive hydraulic circuit between (i) a normal flow rate mode in which the flow rate is a normal flow rate and (ii) an increased flow rate mode in which the flow rate is an increased flow rate higher than the normal flow rate. The controller may be configured or programmed to control, based on the information relating to the speed of switching of the work-attachment-drive control valve included in the selected one of the pieces of operation characteristics information, the speed of switching of the work-attachment-drive control valve when starting the work attachment and/or when stopping the work attachment, regardless of whether the mode relating to the flow rate is the normal flow rate mode or the increased flow rate mode.

The working machine may further include a display to display a list of the work attachments to allow an operator to select one of the work attachments from the list. The controller may be configured or programmed to, upon selection of one of the work attachments from the list displayed on the display, control the speed of switching of the work-attachment-drive control valve when starting the work attachment and/or when stopping the work attachment based on one of the pieces of operation characteristics information that corresponds to the selected one of the work attachments.

The working machine may further include an attachment operating member to be operated by an operator to start or stop the work attachment attached to the attachment mount portion. The controller may be configured or programmed to, based on the selected one of the pieces of operation characteristics information, control the speed of switching of the work-attachment-drive control valve when the attachment operating member is operated.

The working machine may further include an information acquirer to, when the work attachment attached to the attachment mount portion issues information, acquire the information. The controller may be configured or programmed to: when the information acquirer acquires the information issued by the work attachment and the information thus acquired includes identification information identifying the work attachment attached to the attachment mount portion, select one of the pieces of operation characteristics information that corresponds to the work attachment identified by the identification information included in the information acquired by the information acquirer; and based on the selected one of the pieces of operation characteristics information, control the speed of switching of the work-attachment-drive control valve when starting the work attachment and/or when stopping the work attachment.

The identification information identifying the work attachment may include information about a type, a specification, and/or optional equipment of the work attachment.

The working machine may further include an information acquirer to, when the work attachment attached to the attachment mount portion issues information, acquire the information. The controller may be configured or programmed to, when the information acquirer acquires the information issued by the work attachment and the information thus acquired includes another piece of operation characteristics information that corresponds to the work attachment attached to the attachment mount portion and that includes information relating to the speed of switching of the work-attachment-drive control valve other than the pieces of operation characteristics information stored in the memory, control, based on the another piece of operation characteristics information included in the information acquired by the information acquirer, the speed of switching of the work-attachment-drive control valve when starting the work attachment and/or when stopping the work attachment.

The controller may be configured or programmed to control the speed of switching of the work-attachment-drive control valve when starting the work attachment and/or when stopping the work attachment based on the another piece of operation characteristics information included in the information acquired by the information acquirer with higher priority than the pieces of operation characteristics information stored in the memory.

In a second aspect, a working machine includes: an attachment mount portion including a hydraulic fluid port; a work-attachment-drive hydraulic circuit to supply hydraulic fluid to a work attachment attached to the attachment mount portion and fluidly connected to the hydraulic fluid port; a memory to store pieces of hydraulic pressure characteristics information corresponding to respective work attachments each for use as the work attachment attached to the attachment mount portion and fluidly connected to the hydraulic fluid port, the pieces of hydraulic pressure characteristics information each including at least one parameter indicating proper pressure corresponding to a corresponding one of the work attachments; and a display to display a pressure gauge including an indication of the proper pressure corresponding to the corresponding one of the work attachments.

The working machine may further include a controller to select one of the pieces of hydraulic pressure characteristics information corresponding to the respective work attachments stored in the memory that corresponds to the work attachment attached to the attachment mount portion and fluidly connected to the hydraulic fluid port; and cause the display to display the pressure gauge including the indication of the proper pressure corresponding to the work attachment based on the selected one of the pieces of hydraulic pressure characteristics information. The pieces of hydraulic pressure characteristics information corresponding to the respective work attachments may each include, as the at least one parameter, one or more parameters indicating a minimum proper pressure and/or a maximum proper pressure included in a proper pressure range corresponding to a corresponding one of the work attachments. The controller may be configured or programmed to cause the proper pressure range corresponding to the work attachment to be displayed on the pressure gauge, the proper pressure range being defined based on the one or more parameters included in the selected one of the pieces of hydraulic pressure characteristics information.

The pieces of hydraulic pressure characteristics information may each include, as the at least one parameter, a parameter indicating the minimum proper pressure corresponding to the corresponding one of the work attachments. The controller may be configured or programmed to cause the proper pressure range defined based on the parameter to be displayed on the pressure gauge and cause a below-proper-pressure range below the minimum proper pressure to be displayed on the pressure gauge.

The pieces of hydraulic pressure characteristics information may each include, as the at least one parameter, a parameter indicating the maximum proper pressure corresponding to the corresponding one of the work attachments. The controller may be configured or programmed to cause the proper pressure range defined based on the parameter to be displayed on the pressure gauge and cause an above-proper-pressure range above the maximum proper pressure to be displayed on the pressure gauge.

The pieces of hydraulic pressure characteristics information may each include, as the at least one parameter, parameters indicating the minimum proper pressure and the maximum proper pressure corresponding to the corresponding one of the work attachments. The controller may be configured or programmed to cause the proper pressure range defined based on the parameters to be displayed on the pressure gauge, cause a below-proper-pressure range below the minimum proper pressure to be displayed on the pressure gauge, and cause an above-proper-pressure range above the maximum proper pressure to be displayed on the pressure gauge.

The working machine may further include a controller to select one of the pieces of hydraulic pressure characteristics information corresponding to the respective work attachments stored in the memory that corresponds to the work attachment attached to the attachment mount portion and fluidly connected to the hydraulic fluid port; and cause the display to display the pressure gauge including the indication of the proper pressure corresponding to the work attachment based on the selected one of the pieces of hydraulic pressure characteristics information. The pieces of hydraulic pressure characteristics information may each include information relating to selection of whether or not to display the pressure gauge. The controller may be configured or programmed to, if the selected one of the pieces of hydraulic pressure characteristics information includes information indicating not to display the pressure gauge, not cause the display to display the pressure gauge.

The working machine may further include a controller to select one of the pieces of hydraulic pressure characteristics information corresponding to the respective work attachments stored in the memory that corresponds to the work attachment attached to the attachment mount portion and fluidly connected to the hydraulic fluid port; and cause the display to display the pressure gauge including the indication of the proper pressure corresponding to the work attachment based on the selected one of the pieces of hydraulic pressure characteristics information. The display may be operable to display a list of the work attachments to allow an operator to select one of the work attachments from the list. The controller may be configured or programmed to, upon selection of one of the work attachments from the list displayed on the display, cause the display to display the pressure gauge including the indication of the proper pressure corresponding to the selected one of the work attachments based on one of the pieces of hydraulic pressure characteristics information that corresponds to the selected one of the work attachments.

The working machine may further include an information acquirer to, when the work attachment attached to the attachment mount portion issues information, acquire the information. The controller may be configured or programmed to: when the information acquirer acquires the information issued by the work attachment and the information thus acquired includes identification information identifying the work attachment attached to the attachment mount portion, select one of the pieces of hydraulic pressure characteristics information that corresponds to the work attachment identified by the identification information included in the information acquired by the information acquirer; and cause the display to display the pressure gauge based on the selected one of the pieces of hydraulic pressure characteristics information.

The identification information identifying the work attachment may include information about a type, a specification, and/or optional equipment of the work attachment.

The working machine may further include an information acquirer to, when the work attachment attached to the attachment mount portion issues information, acquire the information. The controller may be configured or programmed to, when the information acquirer acquires the information issued by the work attachment and the information thus acquired includes another piece of hydraulic pressure characteristics information that corresponds to the work attachment attached to the attachment mount portion and that includes at least one parameter indicating proper pressure corresponding to the work attachment other than the pieces of hydraulic pressure characteristics information stored in the memory, cause, based on the another piece of hydraulic pressure characteristics information included in the information acquired by the information acquirer, the display to display the pressure gauge including the indication of the proper pressure corresponding to the work attachment.

The controller may be configured or programmed to cause the display to display the pressure gauge including the indication of the proper pressure corresponding to the work attachment based on the another piece of hydraulic pressure characteristics information included in the information acquired by the information acquirer with higher priority than the pieces of hydraulic pressure characteristics information stored in the memory.

The another piece of hydraulic pressure characteristics information included in the information acquired by the information acquirer may include, as the at least one parameter, one or more parameters indicating a minimum proper pressure and/or a maximum proper pressure included in a proper pressure range corresponding to the work attachment. The controller may be configured or programmed to cause the proper pressure range corresponding to the work attachment to be displayed on the pressure gauge, the proper pressure range being defined based on the one or more parameters included in the another piece of hydraulic pressure characteristics information.

The another piece of hydraulic pressure characteristics information included in the information acquired by the information acquirer may include, as the at least one parameter, a parameter indicating the minimum proper pressure corresponding to the work attachment. The controller may be configured or programmed to cause the proper pressure range defined based on the parameter to be displayed on the pressure gauge and cause a below-proper-pressure range below the minimum proper pressure to be displayed on the pressure gauge.

The another piece of hydraulic pressure characteristics information included in the information acquired by the information acquirer may include, as the at least one parameter, a parameter indicating the maximum proper pressure corresponding to the work attachment. The controller may be configured or programmed to cause the proper pressure range defined based on the parameter to be displayed on the pressure gauge and cause an above-proper-pressure range above the maximum proper pressure to be displayed on the pressure gauge.

The another piece of hydraulic pressure characteristics information included in the information acquired by the information acquirer may include, as the at least one parameter, parameters indicating the minimum proper pressure and the maximum proper pressure corresponding to the work attachment. The controller may be configured or programmed to cause the proper pressure range defined based on the parameters to be displayed on the pressure gauge, cause a below-proper-pressure range below the minimum proper pressure to be displayed on the pressure gauge, and cause an above-proper-pressure range above the maximum proper pressure to be displayed on the pressure gauge.

Content of the pieces of hydraulic pressure characteristics information stored in the memory may be changeable by an operator.

The working machine may further include an operator's seat. The display may be positioned such that the display is visually recognizable to an operator seated on the operator's seat regardless of actions of the work attachment attached to the attachment mount portion.

The working machine may further include a pressure detector to detect a hydraulic pressure in the work-attachment-drive hydraulic circuit. The display may be operable to display, on the pressure gauge, the hydraulic pressure detected by the pressure detector.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

FIG. 7 illustrates an instrument panel screen when a hydraulic pressure gauge is turned on.

FIG. 12 illustrates a list of pieces of information for respective work attachments stored in a memory of a working machine.

FIG. 13 illustrates information for a work attachment stored in an IC tag on the work attachment.

DETAILED DESCRIPTION OF THE PREFERRED EMBODIMENTS

Figure 1:
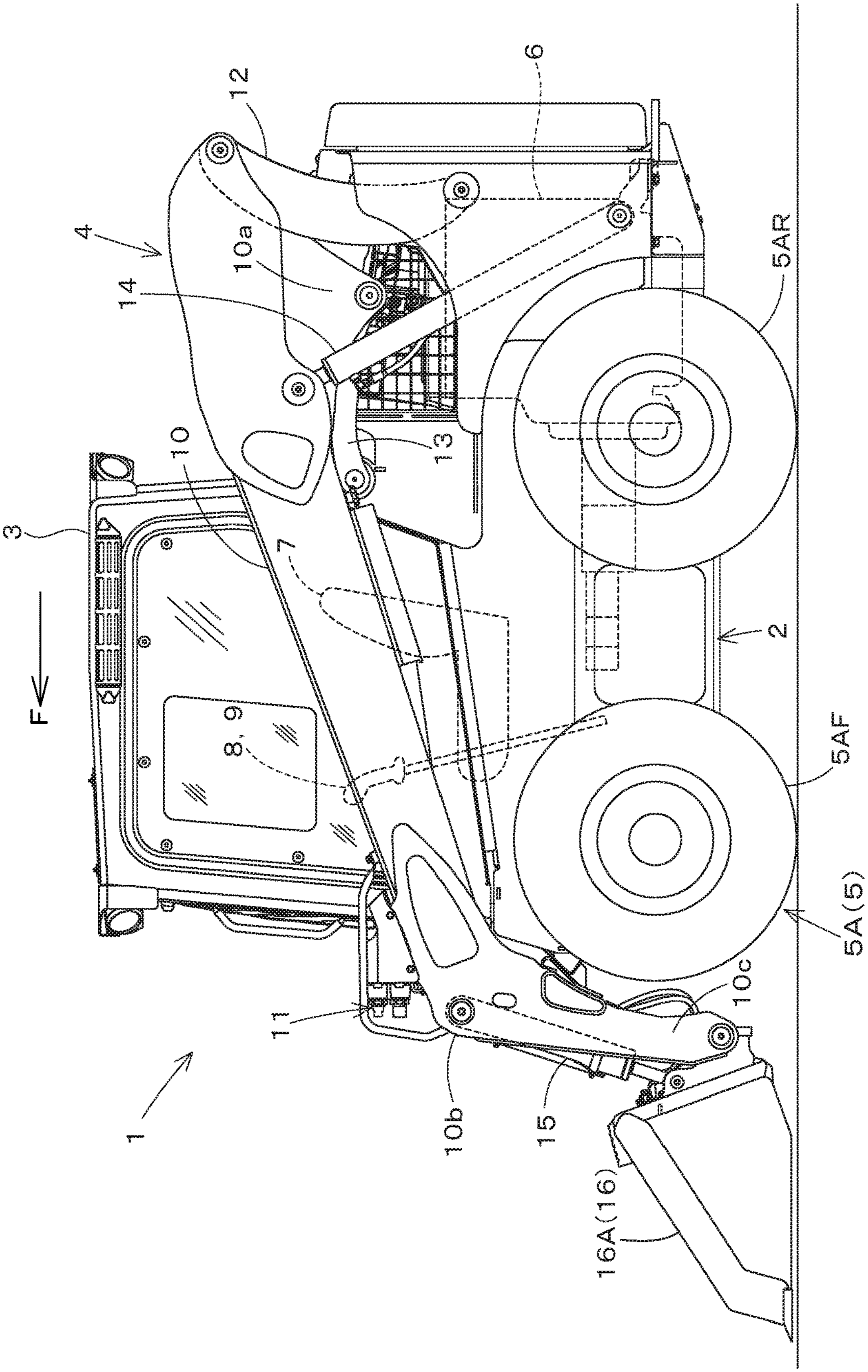
FIG. 1 is a side view of a working machine with a bucket.

The preferred embodiments will now be described with reference to the accompanying drawings, wherein like reference numerals designate corresponding or identical elements throughout the various drawings. The drawings are to be viewed in an orientation in which the reference numerals are viewed correctly.

Figure 2:
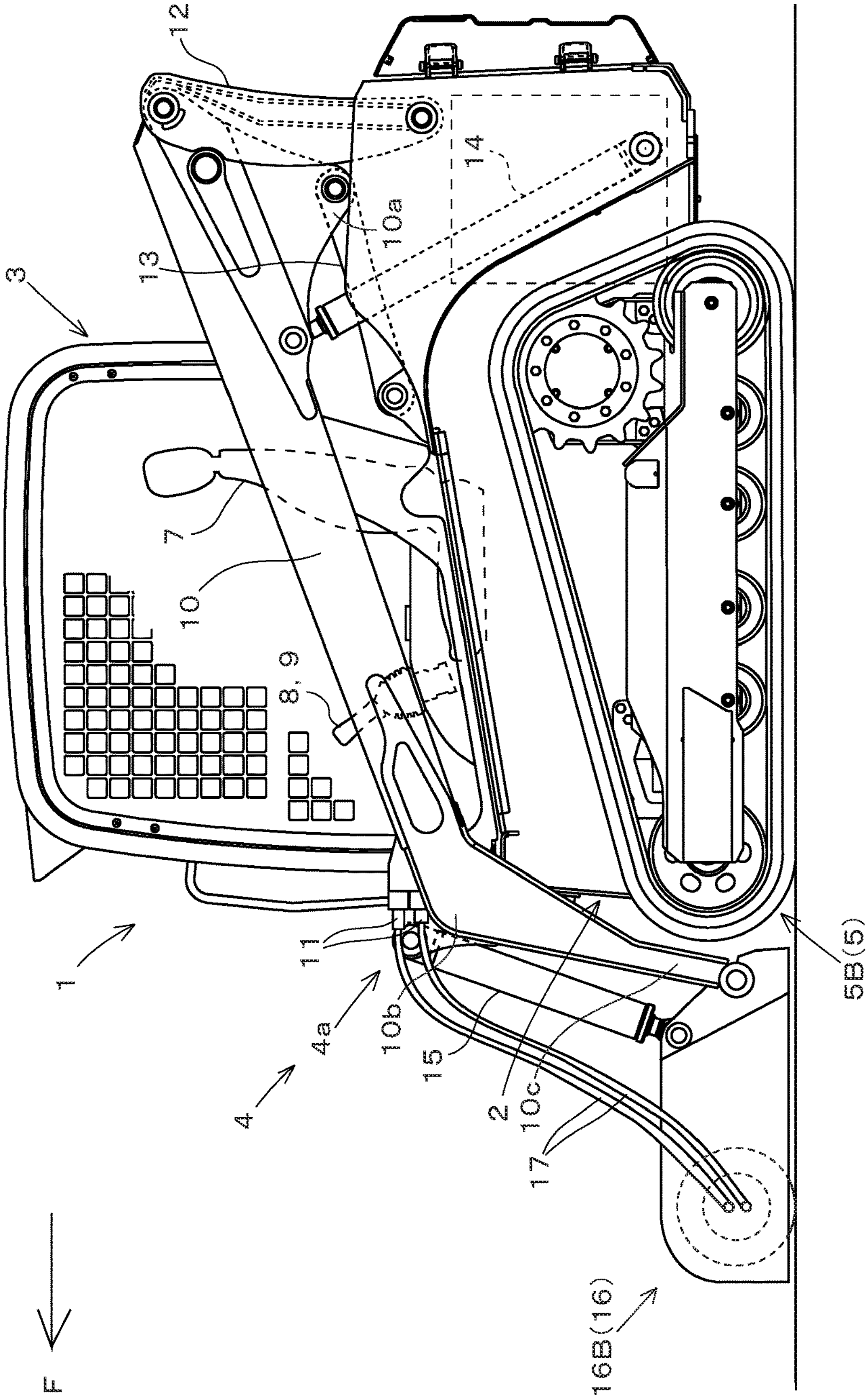
FIG. 2 is a side view of a working machine with a sweeper.

The following description discusses an overall configuration of working machines 1 with reference to FIGS. 1 and 2. The working machine 1 includes a machine body 2, a cabin 3, a working device 4 and a traveling device 5. The cabin 3, the working device 4, and the traveling device 5 are provided on the machine body 2. The "forward direction" in the following description refers to the direction indicated by arrow F in FIGS. 1 and 2, and the "rearward direction" in the following description refers to the direction opposite to the direction indicated by arrow F. The "right" in the following description refers to the right of the working machine 1 when the operator (user) of the working machine 1 is facing in the forward direction (direction indicated by arrow F). The "left" in the following description refers to the left of the working machine 1 when the operator (user) of the working machine 1 is facing in the forward direction (direction indicated by arrow F).

The working machine 1 in FIG. 1 is a skid steer loader whose traveling device 5 is a wheeled traveling device 5A including a pair of left and right front wheels 5AF and a pair of left and right rear wheels 5AR. The working machine 1 in FIG. 2 is a compact track loader whose traveling device 5 is a crawler traveling device 5B.

A prime mover 6 is mounted on the portion of the machine body 2 that is located rearward of the cabin 3. The prime mover 6 is an internal combustion engine such as a diesel engine or a gasoline engine. Alternatively, the prime mover 6 may include an internal combustion engine and/or an electric motor, for example. The prime mover 6 drives hydraulic pumps 32L and 32R in a travel hydraulic system 30 (travel hydraulic circuit) of FIG. 4 and hydraulic pumps P1, P2, and P3 in a work hydraulic system 40 (work hydraulic circuit) of FIG. 5.

An operator's seat 7 is mounted on the machine body 2. The cabin 3 is mounted on the machine body 2 to enclose the operator's seat 7. The cabin 3 is a kind of protector to protect an operator seated on the operator's seat 7, meters and manual operators such as levers and switches arranged in the vicinity of the operator's seat 7, and/or the like. Another protector having such a function, such as a canopy or a rollover protective structure (ROPS), may be mounted on the machine body 2.

Referring to FIGS. 1 and 2, the manual operators to be manually operated by an operator seated on the operator's seat 7 in the cabin 3 include a lever (such as a joystick) 8 (hereinafter referred to as "travel operation lever 8") operable to change the traveling direction and travel speed of the traveling device 5, and a lever (such as a joystick) 9 (hereinafter referred to as "work operation lever 9") operable to swing (move) lift arms 10 (attachment mount portion) of the working device 4 up and down (raise and lower the lift arms 10) and/or swing a work attachment 16 attached to the working device 4 up and down (raise and lower the work attachment 16). The travel operation lever 8 and the work operation lever 9 are located on the left and right sides of a front portion of the operator's seat 7.

Figure 4:
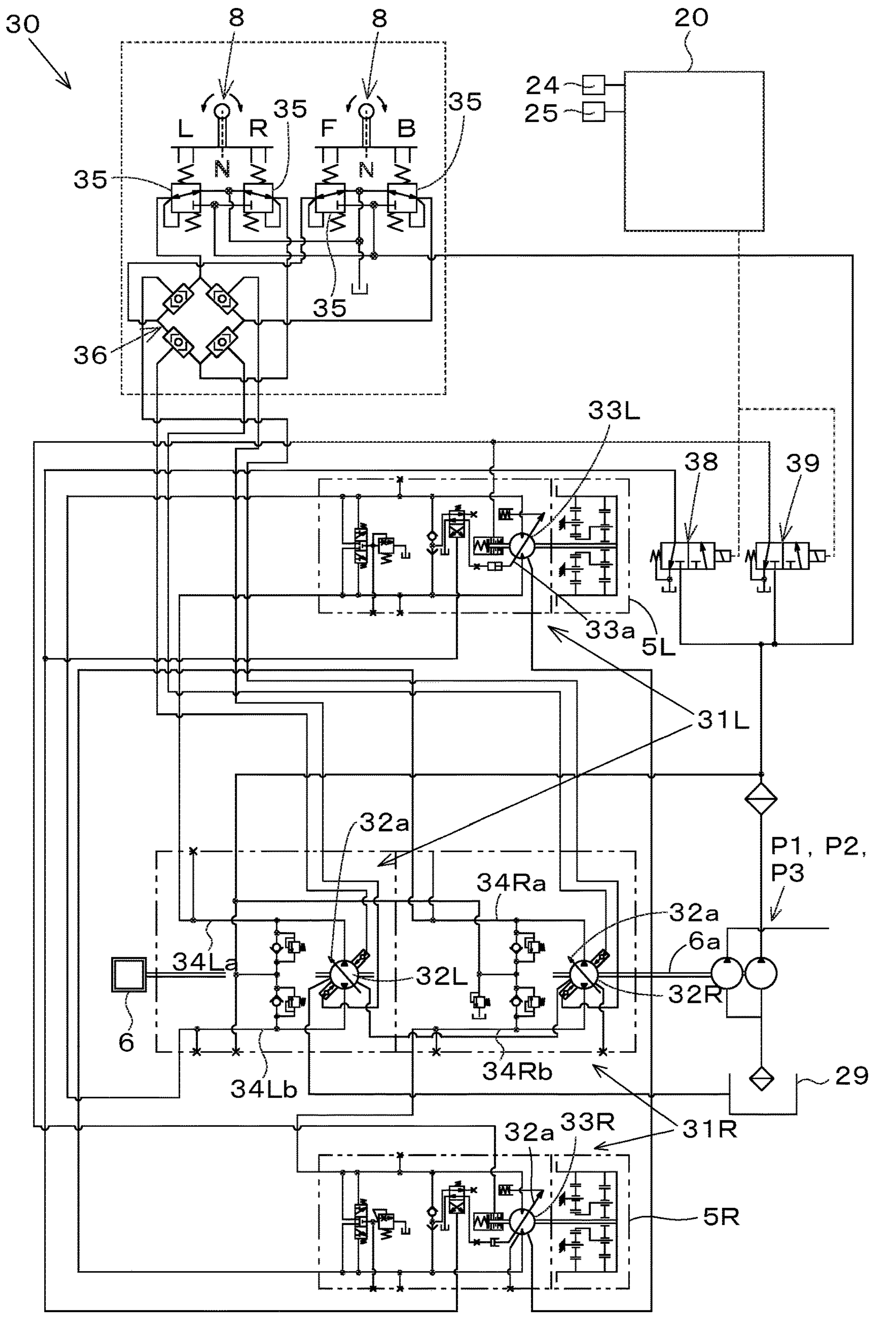
FIG. 4 is a circuit diagram of a travel hydraulic system of a working machine.

The manual operators in the cabin 3 include an auxiliary transmission manual operator (for example, a switch) 24 and a brake manual operator (for example, a pedal) 25 illustrated in FIG. 4. Such manual operators 24 and 25 are operable to control hydraulic motors 33 drivingly connected to the traveling device 5 to control the travel speed of the working machine 1 and brake the working machine 1. The auxiliary transmission manual operator 24 and the brake manual operator 25 are electrically connected to the controller 20 in a wired or wireless manner, as illustrated in FIG. 4. With this, position signals from the auxiliary transmission manual operator 24 and the brake manual operator 25 are inputted into the controller 20. The controller 20 controls corresponding solenoid valves 38 and 39 of the travel hydraulic system 30 (described later) based on the signals inputted from the auxiliary transmission manual operator 24 and the brake manual operator 25.

Figure 3:
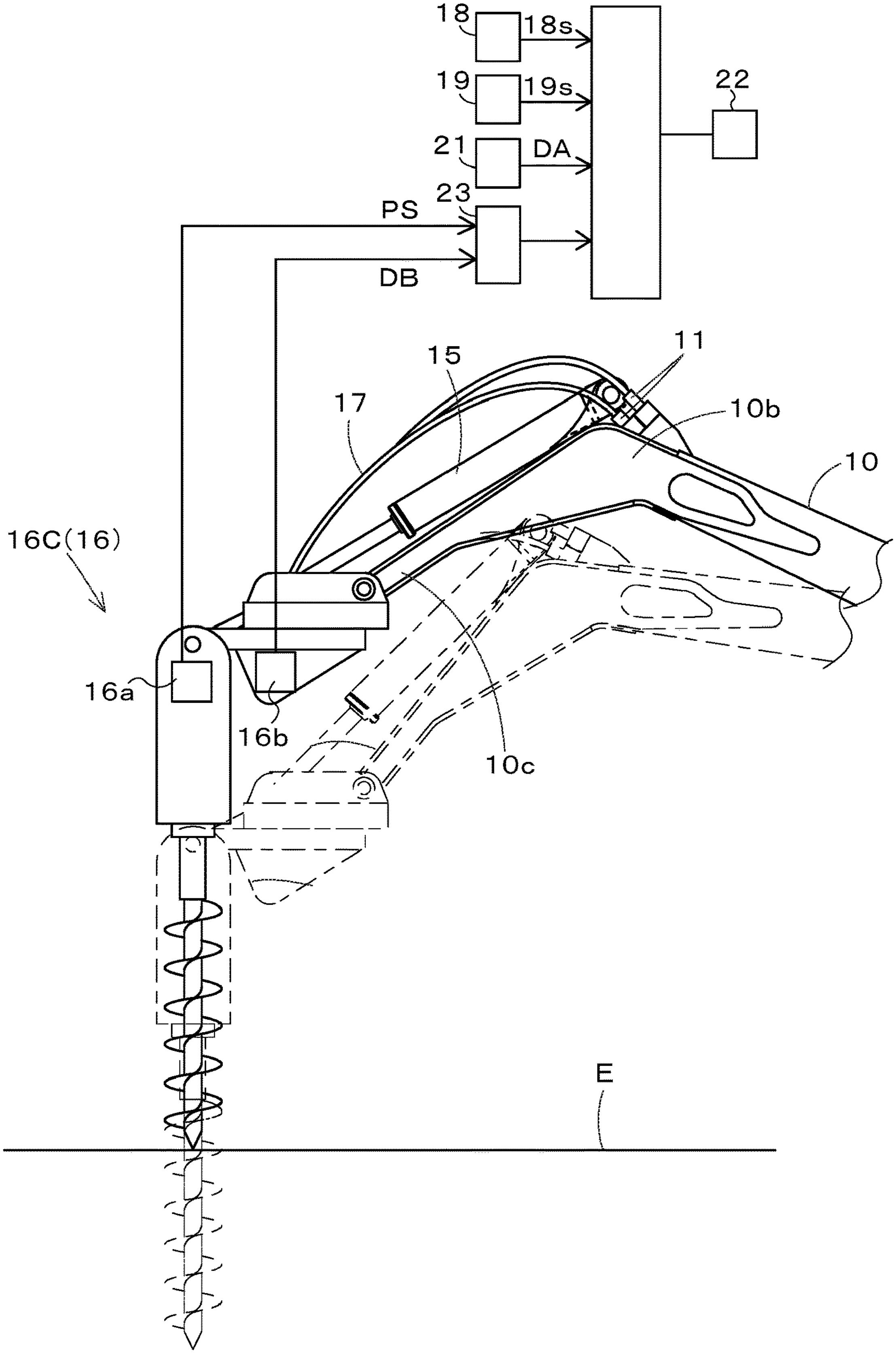
FIG. 3 is a partial side view of a working machine with an earth auger with an IC tag.
Figure 5:
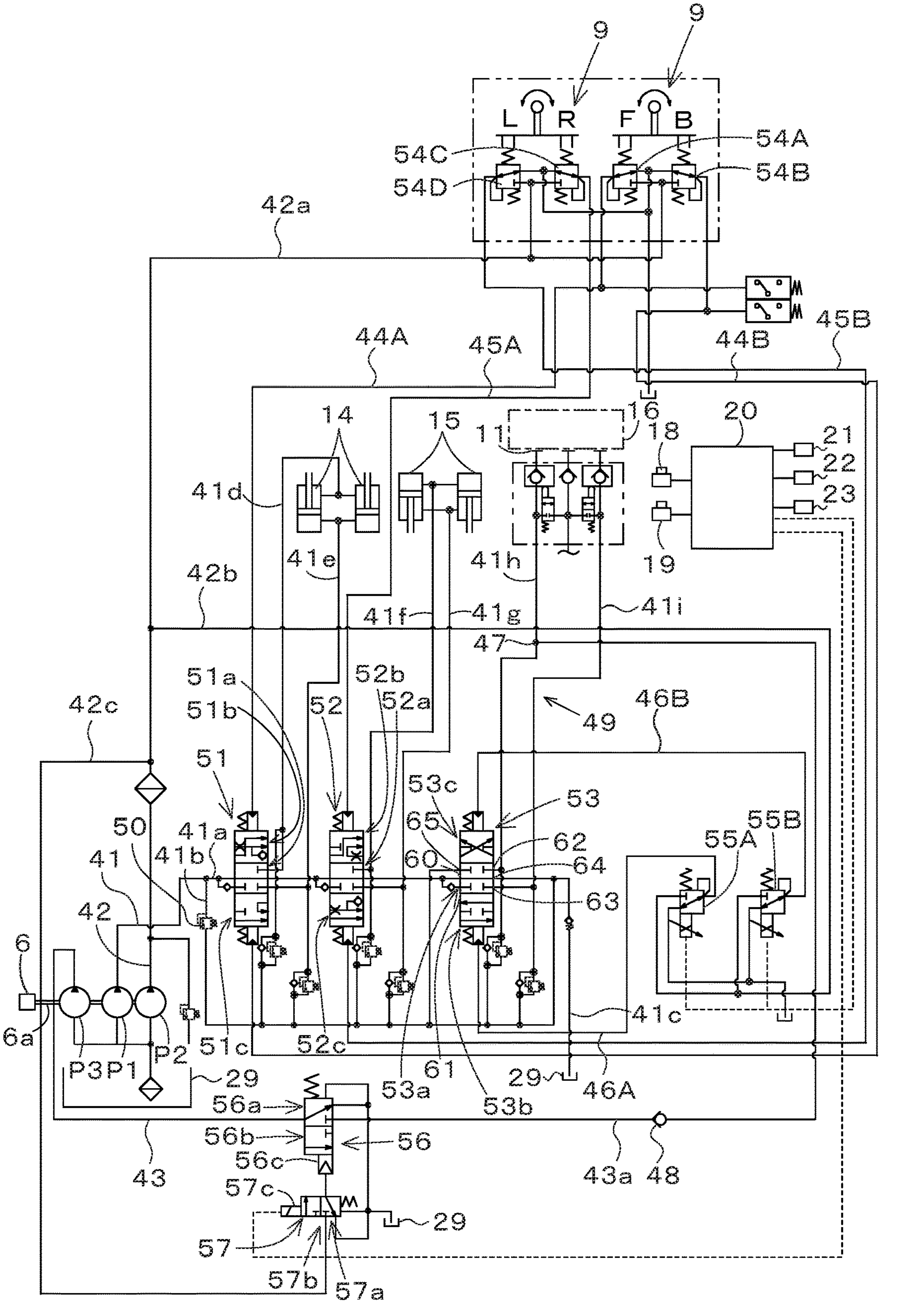
FIG. 5 is a circuit diagram of a work hydraulic system of a working machine.

The manual operators in the cabin 3 include an AUX switch 18 and a flow switch 19 as illustrated in FIGS. 3 and 5. The switches 18 and 19 are used to control AUX actuator (s) which is/are hydraulic actuator(s) when a work attachment 16 including the AUX actuator(s) is attached to the working device 4 (lift arms 10).

Figure 7:
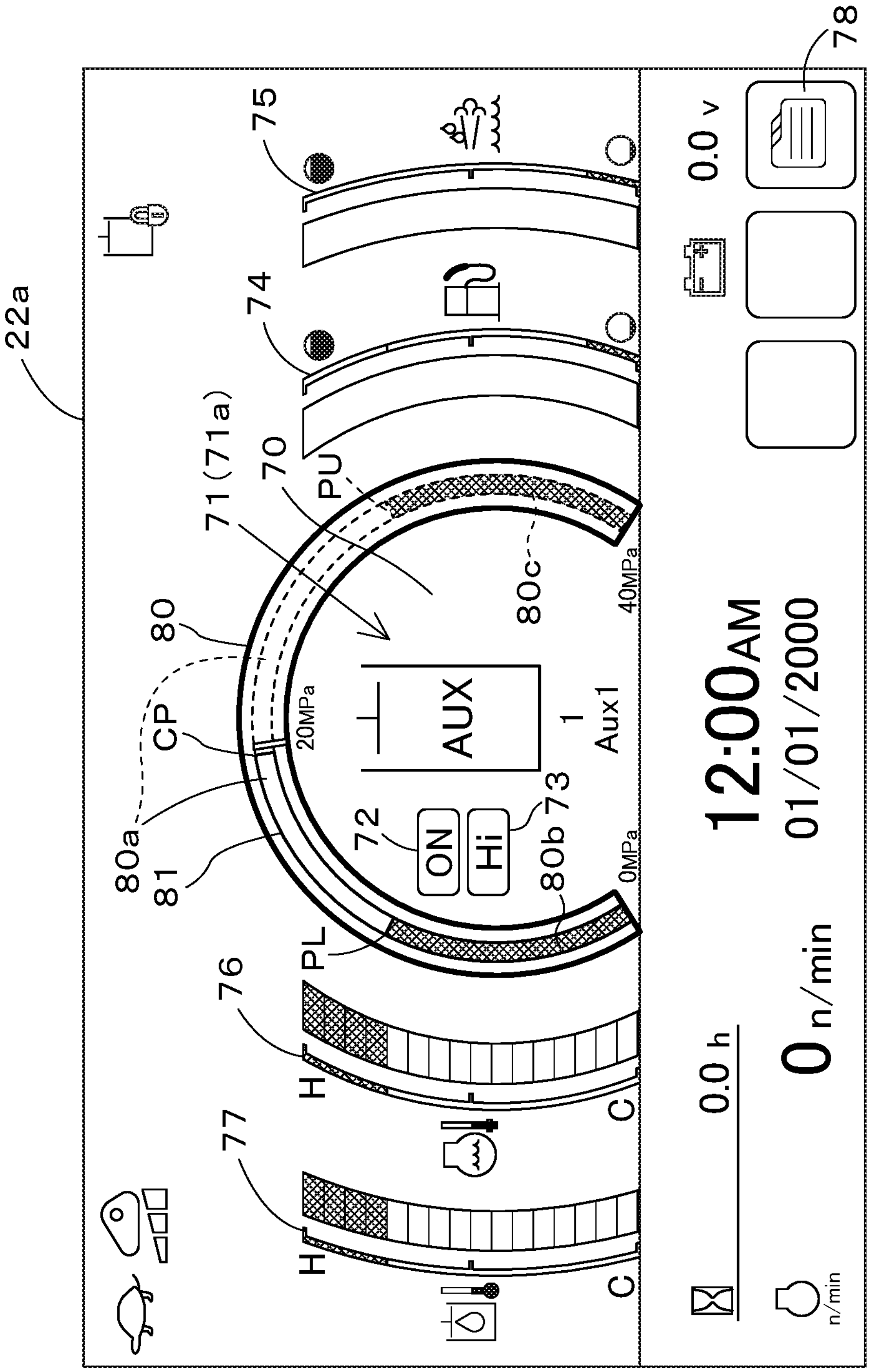

In the cabin 3, a display 22 is provided in front of the operator's seat 7. The display 22 displays an instrument panel screen 22*a* as illustrated in FIG. 7 such that the screen faces toward the operator's seat 7. The instrument panel screen 22*a* includes graphical meter(s) such as a hydraulic pressure gauge 80 (described later), and such graphical meter(s) are visually recognizable to an operator who is seated on the operator's seat 7 and operates the travel operation lever 8, the work operation lever 9, and the like.

The AUX switch 18 and the flow switch 19 are each, for example, a swingable seesaw switch, a push switch, and/or the like, and, for example, may be provided at the top of the work operation lever 9 such that the operator can operate the switch with a finger of the hand holding the work operation lever 9. Alternatively, the switches 18 and/or 19 may be displayed on the instrument panel screen 22*a* as touch switch(es).

The AUX switch 18 is switchable between ON positions and an OFF position. When the AUX switch 18 is in one of the ON positions, the AUX actuator of the work attachment 16 attached to the working device 4 (lift arms 10) is driven. When the AUX switch 18 is in the OFF position, the driving of the AUX actuator is stopped.

More specifically, the AUX switch 18 has a first ON position and a second ON position as the ON positions. For example, assume that the work attachment 16 attached to the working device 4 (lift arms 10) is an earth auger 16C as illustrated in FIG. 3 and the AUX actuator is a hydraulic motor rotatable in forward and reverse directions. In such a case, placing the AUX switch 18 in the first ON position may cause the earth auger 16D to rotate in the forward direction, and placing the AUX switch 18 in the second ON position may cause the earth auger 16D to rotate in the reverse direction.

The flow switch 19 is switchable between a normal flow position and a high flow position. When the flow switch 19 is in the normal flow position, the flow rate of hydraulic fluid supplied to the AUX actuator of the work attachment 16 attached to the working device 4 (lift arms 10) is a normal flow rate. When the flow switch 19 is in the high flow position, the flow rate of hydraulic fluid supplied to the AUX actuator is increased.

The AUX switch 18 and the flow switch 19 are electrically connected to the controller 20 in a wired or wireless manner as illustrated in FIGS. 3 and 5. With this, a position signal 18*s* from the AUX switch 18 and a position signal 19*s* from the flow switch 19 are inputted into the controller 20. The controller 20 controls corresponding solenoid valves 55A, 55B, and 57 of the work hydraulic system 40 (described later) based on the position signals 18*s* and 19*s* inputted from the AUX switch 18 and the flow switch 19.

The working device 4 includes a pair of the left and right lift right arms 10 (attachment mount portion) attached to the machine body 2 swingably up and down with respect to the machine body 2. The left lift arm 10 of the pair of left and right lift arms 10 is on the left side of the cabin 3. The right lift arm 10 is on the right side of the cabin 3. Each left arm 10 extends lengthwise in the fore-and-aft direction of the working machine 1.

Front portions of the left and right lift arms 10 are connected to each other via a connection member in front of the cabin 3. Rear portions of the left and right lift arms 10 are connected to each other via a connection member behind the cabin 3. An assembly of left right and the lift arms 10 and the front and rear connection members assembled in this way, defining and functioning as a main body 4*a* of the working device 4, is attached to the machine body 2 swingably up and down with respect to the machine body 2.

The manner in which the left and right lift arms 10 are connected to each other is not limited to using the front and rear connection members as described above. The left and right lift arms 10 may be connected to each other in any manner, provided that the left and right lift arms 10 are swingable together up and down with respect to the machine body 2.

The working device 4 includes a pair of left and right lift links 12 and a pair of left and right control links 13 to support the left and right lift arms 10 at a rear portion of the machine body 2. The working device 4 includes a pair of left and right lift arm cylinders 14 as hydraulic actuators to swing the left and right lift arms 10 up and down with respect to the machine body 2.

FIGS. 1 and 2, each of which is a left side view of the working machine 1, illustrate the left lift arm 10, the left lift link 12, the left control link 13, and the left lift arm cylinder 14 which are located leftward of the cabin 3. The right lift arm 10, the right lift link 12, the right control link 13, and the right lift arm cylinder 14 are located rightward of the cabin 3 in a similar manner.

Note that, in FIGS. 1 and 2, the left and right lift arms 10 movable (swingable) up and down with respect to the machine body 2 (the main body 4*a* of the working device 4 that includes the left and right lift arms 10) are in the lowered state such that the work attachment 16 attached at the distal ends thereof makes contact with the ground. In the following description, the positions, orientations/directions, and the like of the elements of the working device 4 are discussed on the assumption that the left and right lift arms 10 are in such a lowered state.

Each of the lift links 12 extends substantially vertically, is pivotally connected at a top end thereof to a rear end of a corresponding lift arm 10, and is pivotally connected at a bottom end thereof to an upper rear portion of the machine body 2. At a position forward of the lift link 12, a head of a piston rod of a corresponding lift arm cylinder 14 is pivotally connected to the lift arm 10. The bottom end (cylinder bottom) of the lift arm cylinder 14 is pivotally connected to a lower rear portion of the machine body 2.

Each of the lift arm cylinders 14 includes a piston. The piston is moved by hydraulic pressure to extend or retract the piston rod. When the piston rods of the lift arm cylinders 14 retract, the lift arms 10 descend (front portions of the lift arms 10 pivot downward with respect to the machine body 2). When the piston rods of the lift arm cylinders 14 extend, the lift arms 10 ascend (front portions of the lift arms 10 pivot upward with respect to the machine body 2).

Each of the lift arms 10 is provided with a downwardly projecting bracket 10*a* that is located between, in the fore-and-aft direction, the rear end of the lift arm 10 and the portion of the lift arm 10 that pivotally supports the piston rod of a corresponding lift arm cylinder 14. Each of the control links 13 extends substantially in the fore-and-aft direction, is pivotally connected at a front end thereof to an upper rear portion of the machine body 2, and is pivotally connected at a rear end thereof to a corresponding bracket 10*a* of the lift arm 10, when the lift arms 10 are in the lowered position as illustrated in FIGS. 1 and 2.

The lift arms 10 each include a bent portion 10*b* located forward of the cabin 3, and extend forward from their rear ends pivotally connected to the lift links 12 to the bent portions 10*b*. The lift arms 10 each include a distal end portion 10*c* extending downward from its corresponding bent portion 10*b*. The distal end portions 10*c* of the left and right lift arms 10 are configured to have the work attachment 16 pivotally attached thereto.

The working device 4 includes a pair of left and right attachment cylinders 15. The left and right attachment cylinders 15 are hydraulic actuators to support the work attachment 16 attached to the distal end portions 10*c* of the left and right lift arms 10 and swing the work attachment 16 up and down with respect to the lift arms 10.

Each of the attachment cylinders 15 is pivotally connected to the bent portion 10*b* of a corresponding lift arm 10 at a cylinder bottom thereof (an upper end thereof). Each of the pair of left and right attachment cylinders 15 is pivotally connected at the distal end of the piston rod thereof (at a lower end thereof) to the work attachment 16 attached to the distal end portions 10*c* of the lift arms 10.

The attachment 16 is pivotally connected at a rear portion thereof to the distal end portions 10*c* of the left and right lift arms 10 and to the distal ends of the piston rods of the attachment cylinders 15 in this way, so that the work attachment 16 is attached to the working device 4 (to the main body 4*a* of the working device 4) swingably up and down with respect to the working device 4 (lift arms 10).

Upon upward extension of the piston rods of the left and right lift arm cylinders 14 from the state in FIGS. 1 and 2 in which the left and right lift arms 10 are in the lowered position, the piston rods raise the lift arms 10, so that, eventually, the lift arms 10 (the main body 4*a* of the working device 4) swing such that the angle between the lift arms 10 and the lift links 12 increases. Accordingly, the control links 13 swing diagonally forward and upward and front portions (the bent portions 10*b* and the distal end portions 10*c*) of the lift arms 10 move upward.

When the ends of the control links 13 pivotally connected to the brackets 10*a* of the lift arms 10 are moved by swinging the control links 13 diagonally forward and upward and reach their highest position in the range of the up-and-down movement, the left and right lift arms 10 (the main body 4*a* of the working device 4) can no longer be raised upward. In other words, when the ends of the control links 13 pivotally connected to the lift arms 10 reach this position, the left and right lift arms 10 (the main body 4*a* of the working device 4) reach their fully raised position (i.e., the arm height reaches the maximum), and the lift arm cylinders 14 are in their fully extended position.

The following description discusses the swinging of the work attachment 16 attached to the working device 4 relative to the lift arms 10. As the piston rods of the left and right attachment cylinders 15 located between the work attachment 16 and the left and right lift arms 10 extend, the work attachment 16 swings diagonally rearward and downward with respect to the lift arms 10 (in the anticlockwise direction in a left side view of the working machine 1 as illustrated in FIGS. 1 and 2). As the piston rods of the left and right attachment cylinders 15 retract, the work attachment 16 swings diagonally forward and upward with respect to the lift arms 10 (in the clockwise direction in a left side view of the working machine 1 as illustrated in FIGS. 1 and 2.)

The attachment mount portion of the working device 4 (distal end portion(s) 10*c* of the lift arm(s) 10) is configured to have various kinds of work attachments 16 attached thereto in this way. Examples of the various kinds of work attachments 16 include backets, dozer blades, brushcutters, tree-pullers, hydraulic crushers, hydraulic breakers, angle brooms, earth augers, pallet forks, sweepers, mowers, snow-blowers, powered rakes, and so on.

FIGS. 1 to 3 illustrate some types of work attachments 16 each attached to the working device 4 of the working machine 1, as examples of the work attachment 16 attached to the working device 4. The work attachment 16 illustrated in FIG. 1 is a bucket 16A. The work attachment 16 illustrated in FIG. 2 is a sweeper 16B. The work attachment 16 illustrated in FIG. 3 is an earth auger 16C.

Note that it is possible to selectively attach various types of work attachments 16 to the working device 4 of the working machine 1 (to the distal end portion(s) 10*c* of the lift arm(s) 10), and also possible to selectively attach work attachments 16 of the same type having different sizes and/or different specifications to the working device 4 of the working machine 1 (to the distal end portion(s) 10*c* of the lift arm(s) 10).

Some types of work attachment 16 such as the sweeper 16B in FIG. 2 and the earth auger 16C in FIG. 3 include its own hydraulic actuator(s) such as hydraulic motor(s) (i.e., AUX actuator(s)). For the purpose of supplying hydraulic fluid from the working machine 1 to the AUX actuator(s) of such a work attachment 16, one of the pair of left and right lift arms 10 (in the present preferred embodiment, the left lift arm 10) has, on the bent portion 10*b* thereof, a pair of AUX ports (hydraulic fluid ports) 11.

The AUX ports 11 are couplers and project from the corresponding lift arm 10. The AUX ports (couplers) 11 can have connected thereto fluid pipes such as hoses, which are connectable at their ends to hydraulic actuator(s) (AUX actuator(s)) of the attachment 16 attached to the front ends of the left and right lift arms 10.

The following discusses communication (information exchange) between a work attachment 16 including an AUX actuator (earth auger 16C in the present embodiment) and the controller 20 of the working machine 1, and the like, with reference to FIG. 3. The working machine 1 includes the controller 20 configured or programmed to control, for example, the solenoid valves 55A, 55B, and 57 for work (described later) and cause the display 22 to display various indications. The controller 20 is electrically connected to a memory 21, the display 22, and a communication device 23 in a wired or wireless manner.

Note that the memory 21 and the communication device 23 may each be a mobile one that is independent of the controller 20 or an electric circuit contained in the controller 20. The display 22 may be included in a dashboard or the like in the cabin 3 or a mobile terminal that can be carried by an operator.

The work attachment 16 including an AUX actuator, such as the earth auger 16C, includes a hydraulic pressure detector 16*a* to detect hydraulic pressure acting on the AUX actuator. Regardless of whether an AUX actuator is included or not, some work attachments 16 include an IC tag 16*b* which stores attachment-specific information DB including identification information of the work attachment 16 and/or the like, such as the one provided on the earth auger 16C in FIG. 3.

The communication device 23 of the working machine 1 communicates with the hydraulic pressure detector 16*a* and the IC tag 16*b* of the work attachment 16 (earth auger 16C) in a wired or wireless manner, receives a detected hydraulic pressure signal PS indicative of the hydraulic pressure detected by the hydraulic pressure detector 16*a* from the hydraulic pressure detector 16*a*, and receives a signal indicative of the information DB relating to the work attachment 16 (earth auger 16C) from the IC tag 16*b*.

The controller 20 acquires the position signals 18*s* and 19*s* from the AUX switch 18 and the flow switch 19, respectively, as described earlier, and acquires the detected hydraulic pressure signal PS and the signal indicative of the information DB transmitted from the work attachment 16 and received at the communication device 23.

The memory 21 also stores pieces of information DA for respective work attachments 16 (which will be described later in detail). Upon selection of one of the work attachments 16 using the display 22 by an operator, the controller 20 acquires a piece of information DA about the selected one of the work attachments 16.

The controller 20 determines what content (such as a hydraulic pressure gauge 80, described later) is to be displayed on the instrument panel screen 22*a* of the display 22 and controls the solenoid valves 55A and 55B and the solenoid valve 57 for control of the AUX actuator, based on the information DA or DB and the position signals 18*s* and 19*s* from the AUX switch 18 and the flow switch 19. The controller 20 also causes the actual hydraulic pressure to be indicated on the hydraulic pressure gauge 80 of the instrument panel screen 22*a* based on the detected hydraulic pressure signal PS (which will be described later in detail).

Note that some types of work attachments 16 such as the bucket 16A in FIG. 1 do not include its own hydraulic actuators (AUX actuators), and it is not necessary to supply hydraulic fluid from the working machine 1 via the AUX ports 11. This can be recognized by the controller 20 acquiring the information DA or DB. In such a case, the controller 20 does not cause the display 22 to display the hydraulic pressure gauge 80, for example, as described later. Furthermore, when a work attachment 16 including no AUX actuators is attached to the working device 4, the AUX ports 11 are closed.

The working machine 1 includes a hydraulic circuit as a travel hydraulic system 30 illustrated in FIG. 4 and a hydraulic circuit as a work hydraulic system 40 illustrated in FIGS. 5.

The following description discusses the travel hydraulic system 30 to control drive of the traveling device 5 with reference to the hydraulic circuit diagram in FIG. 4. It is assumed here that the traveling device 5 (including the traveling devices 5A and 5B and the like) includes a left traveling device 5L on the left portion of the machine body 2 and a right traveling device 5R on the right portion of the machine body 2, which can be driven independently of each other.

The travel hydraulic system 30 includes hydrostatic stepless transmissions (HSTs) 31L and 31R provided on the machine body 2. The HST 31L includes a hydraulic pump 32L, a hydraulic motor 33L, and a pair of fluid passages 34La and 34 Lb between the hydraulic pump 32L and the hydraulic motor 33L. The HST 31R includes a hydraulic pump 32R, a hydraulic motor 33R, and a pair of fluid passages 34Ra and 34Rb between the hydraulic pump 32R and the hydraulic motor 33R.

The hydraulic pumps 32L and 32R are drivingly connected to an output shaft 6*a* of the prime mover 6 to be rotated together synchronously with the output rotation of the prime mover 6. The hydraulic motor 33L is drivingly connected to the left traveling device 5L. The hydraulic motor 33R is drivingly connected to the right traveling device 5R.

Note that the hydraulic pumps 32L and 32R may be provided coaxially to the output shaft 6*a* and be drivingly connected to the output shaft 6*a* such that the hydraulic pumps 32L and 32R are not rotatable relative to the output shaft 6*a,* and may be drivingly connected to the output shaft 6*a* via gear(s), an endless belt, and/or the like.

The hydraulic pumps 32L and 32R are variable displacement hydraulic pumps including respective movable swash plates 32*a*. Each of the hydraulic pumps 32L and 32R is configured such that the direction and the flow rate of hydraulic fluid delivered by the hydraulic pump are controlled by changing the tilt direction and angle of the movable swash plate 32*a* by pilot hydraulic pressure.

The output shaft 6*a* of the prime mover 6 is drivingly connected to the hydraulic pumps P1, P2, and P3 (described later). The hydraulic pump P2 is driven by the prime mover 6 to suck fluid from a hydraulic fluid tank 29 and delivers the fluid. A portion of the fluid delivered by the hydraulic pump P2 is supplied to the HSTs 31L and 31R.

Fluid delivered by one of the hydraulic pumps P1, P2, and P3 (for example, hydraulic pump P2) is supplied through pump control valves 35 and shuttle valves 36 operably connected to the travel operation lever 8 to the hydraulic pumps 32L and 32R, as pilot pressure fluid for control of the movable swash plates 32*a*.

The travel operation lever 8 can be pivoted from the neutral position (N) in all directions including forward (F), rearward (B), leftward (L), and rightward (R) directions. The direction in which the travel operation lever 8 is pivoted from the neutral position (N) and the angle at which the travel operation lever 8 is pivoted (the degree of pivoting of the travel operation lever 8) determine the direction in which the movable swash plates 32*a* of the hydraulic pumps 32L and 32R are titled and the angle at which the movable swash plates 32*a* are tilted, respectively. This stops or drives the hydraulic motors 33L and 33R (left traveling device 5L and the right traveling device 5R) and determines the direction of driving/rotation and the speed of driving/rotation of the hydraulic motors 33L and 33R (left traveling device 5L and the right traveling device 5R). Thus, the direction of travel (turn) and travel speed of the working machine 1 (machine body 2) are controlled according to how the travel operation lever 8 is operated (the direction in which and the degree to which the travel operation lever 8 is pivoted).

Note that each of the hydraulic motors 33L and 33R is a variable displacement motor, and includes a movable swash plate 33*a* movable between the two positions: a large-displacement, low-speed-stage position; and a small-displacement, high-speed-stage position. The travel hydraulic system 30 includes an auxiliary-transmission hydraulic actuator to switch the movable swash plates 33*a* of both the hydraulic motors 33L and 33R concurrently between the low-speed-stage position and the high-speed-stage position. The controller 20 controls the solenoid valve 38 according to how the auxiliary transmission manual operator 24 is operated to control the supply of hydraulic fluid to the auxiliary-transmission hydraulic actuator, thus changing the position of each of the movable swash plates 33*a* of the hydraulic motors 33L and 33R to switch the travel speed stage of the working machine 1 between a high speed stage and a low speed stage.

Each of the hydraulic motors 33L and 33R is provided with a braking hydraulic actuator. Upon movement of the brake manual operator 25 to a braking position, the controller 20 changes the position of the solenoid valve 39 to control the supply of hydraulic fluid to the braking hydraulic actuators, thus braking the hydraulic motors 33L and 33R, i.e., stopping the travel of the working machine 1.

The following description discusses the work hydraulic system 40 to control hydraulic actuators of the working device 4 and the work attachment 16 with reference to the hydraulic circuit diagram of FIG. 5. The work hydraulic system 40 includes the hydraulic pumps P1, P2, and P3. The hydraulic pumps P1, P2, and P3 are, for example, fixed displacement hydraulic pumps such as gear pumps.

The hydraulic pumps P1, P2, and P3 are drivingly connected to the output shaft 6*a* of the prime mover 6. The hydraulic pumps P1, P2, and P3 suck hydraulic fluid from the hydraulic fluid tank 29 and deliver hydraulic fluid from their respective delivery ports. Note that the hydraulic pumps P1, P2, and P3 may be provided coaxially to the output shaft 6*a* and be drivingly connected to the output shaft 6*a* such that the hydraulic pumps P1, P2, and P3 are not rotatable relative to the output shaft 6*a*, and may be drivingly connected to the output shaft 6*a* via gear(s), an endless belt, and/or the like.

The hydraulic pump P1 delivers hydraulic fluid to actuate hydraulic actuator(s). The hydraulic actuator(s) actuated by hydraulic fluid delivered by the hydraulic pump PI include the lift arm cylinders 14 and the attachment cylinders 15. Furthermore, when a work attachment 16 including AUX actuator(s) is attached to the lift arm(s) 10, the AUX actuator(s) fluidly connected to the AUX ports 11 is/are also included in such hydraulic actuator(s).

A fluid delivery passage 41 extends from the delivery port of the hydraulic pump P1. The fluid delivery passage 41 separates into a hydraulic fluid passage 41*a* and a bypass fluid passage 41*b*. Hydraulic fluid flowing through the fluid delivery passage 41 is subjected to pressure regulation at a pressure regulating valve 50 of the bypass fluid passage 41*b* and enters the hydraulic fluid passage 41*a*.

A lift arm control valve 51, an attachment control valve 52, and an AUX control valve (work-attachment-drive control valve) 53 are arranged in this order in an upstream-to-downstream direction in a tandem manner, and the hydraulic fluid passage 41*a* extends such that the hydraulic fluid passage 41*a* passes through the centers of the control valves 51, 52, and 53. The hydraulic fluid passage 41*a* merges, at a location downstream of the AUX control valve 53, with the bypass fluid passage 41*b* in which fluid released from the pressure regulating valve 50 flows to form a drain fluid passage 41*c*, so that fluid returns to the hydraulic fluid tank 29.

In the present embodiment, the lift arm control valve 51, the attachment control valve 52, and the AUX control valve 53 are each a linear spool three-way switching valve controlled by pilot hydraulic pressure. Specifically, each of the control valves 51, 52, and 53 includes a spool which, upon receipt of pilot hydraulic pressure, is switchable (movable) between (i) a stop position (neutral position), (ii) a first drive position located in a first direction from the stop position (neutral position), and (iii) a second drive position located in a second direction from the stop position (neutral position). The second direction is opposite to the first direction.

The lift arm control valve 51 is connected to the lift arm cylinders 14 via fluid supply/discharge passages 41*d* and 41*e*. The attachment control valve 52 is connected to the attachment cylinders 15 via fluid supply/discharge passages 41*f* and 41*g*. The AUX control valve (work-attachment-drive control valve) 53 is connected to the AUX ports 11 via fluid supply/discharge passages 41*h* and 41*i*. The fluid supply/discharge passages 41*h* and 41*i* are a portion of an AUX hydraulic circuit (work-attachment-drive hydraulic circuit) 49.

When the spool of the lift arm control valve 51 is in the first drive position 51*b* or the second drive position 51*c*, hydraulic fluid is supplied from the lift arm control valve 51 to one of rod-side and bottom-side fluid chambers of each of the lift arm cylinders 14, and hydraulic fluid is discharged from the other of the rod-side and bottom-side fluid chambers to the lift arm control valve 51, via the fluid supply/discharge passages 41*d* and 41*e*. When the spool of the lift arm control valve 51 is in the stop position 51*a*, the supply and discharge of hydraulic fluid between the lift arm control valve 51 and the lift arm cylinders 14 via the fluid supply/discharge passages 41*d* and 41*e* are stopped.

When the spool of the attachment control valve 52 is in the first drive position 52*b* or the second drive position 52*c*, hydraulic fluid is supplied from the attachment control valve 52 to one of rod-side and bottom-side fluid chambers of each of the attachment cylinders 15, and hydraulic fluid is discharged from the other of the rod-side and bottom-side fluid chambers to the attachment control valve 52, via the fluid supply/discharge passages 41*f* and 41*g*. When the spool of the attachment control valve 52 is in the stop position 52*a*, the supply and discharge of hydraulic fluid between the attachment control valve 52 and the attachment cylinders 15 via the fluid supply/discharge passages 41*f* and 41*g* are stopped.

In the case were the work attachment 16 attached to the lift arms 10 includes AUX actuator(s), the AUX actuator(s) is/are fluidly connected to the AUX ports 11, and the AUX control valve 53 is fluidly connected to the AUX actuator(s) via the work-attachment-drive hydraulic circuit 49 (the fluid supply/discharge passages 41*h* and 41*i*) and the AUX ports 11 The AUX control valve 56 changes the degree of opening of ports thereof which are in communication with the work-attachment-drive hydraulic circuit 49.

When the spool of the AUX control valve 53 is in the first drive position 53*b* or the second drive position 53*c*, the ports in communication with the work-attachment-drive hydraulic circuit 49 (the fluid supply/discharge passages 41*h* and 41*i*) are fully opened and hydraulic fluid is supplied and discharged at the maximum flow rate between the AUX control valve 53 and the AUX actuator(s) via the work-attachment-drive hydraulic circuit 49 (the fluid supply/discharge passages 41*h* and 41*i*), so that the AUX actuator(s) is/are driven. When the spool of the AUX control valve 53 is in the stop position 53*a*, the ports in communication with the work-attachment-drive hydraulic circuit 49 (the fluid supply/discharge passages 4 1*h* and 41*i*) are fully closed and the supply and discharge of hydraulic fluid between the AUX control valve 53 and the AUX actuator(s) via the work-attachment-drive hydraulic circuit 49 (the fluid supply/discharge passages 41*h* and 41*i*) are stopped (the flow rate is zero), so that the AUX actuator(s) stop(s) being driven.

The hydraulic pump P2 sucks hydraulic fluid from the hydraulic fluid tank 29, and delivers the sucked hydraulic fluid via a fluid delivery passage 42 extending from the delivery port of the hydraulic pump P2, as pilot pressure fluid to control the control valves 51, 52, and 53 for control of hydraulic actuators.

The fluid delivery passage 42 separates into a branch fluid passage 42*a*, a branch fluid passage 42*b*, and a branch fluid passage 42*c*. Fluid delivered by the hydraulic pump P2 is supplied to operation valves 54A, 54B, 54C, and 54D via the branch fluid passage 42*a*, supplied to the proportional solenoid valves 55A and 55B via the branch fluid passage 42*b*, and supplied to the switching solenoid valve 57 via the branch fluid passage 42*c*. The branch fluid passage 42*c* branches from the portion of the fluid delivery passage 42 that is located upstream of the point at which the fluid delivery passage 42 separates into the branch fluid passages 42*a* and 42*b*.

The operation valves 54A and 54B are operable to supply fluid from the hydraulic pump P2, as pilot pressure fluid, to the lift arm control valve 51 via respective pilot pressure fluid passages 44A and 44B. The operation valves 54C and 54D are operable to supply fluid from the hydraulic pump P2, as pilot pressure fluid, to the attachment control valve 52 via respective pilot pressure fluid passages 45A and 45B.

The operation valves 54A to 54D are operably connected to the work operation lever 9. The work operation lever 9 is supported such that the work operation lever 9 is pivotable from a neutral position (N) forward and rearward (along the fore-and-aft direction) (F-B), leftward and rightward (along a sideways direction) (L-R), and in diagonal directions. By pivoting the work operation lever 9, it is possible to operate corresponding one or more of the operation valves 54A, 54B, 54C, and 54D located below the work operation lever 9.

For example, when the work operation lever 9 is pivoted forward (F) from the neutral position (N), the operation valve 54A supplies pilot pressure fluid to the lift arm control valve 51 via the pilot pressure fluid passage 44A, and the spool of the lift arm control valve 51, upon receipt of the pilot pressure of the pilot pressure fluid, moves from the stop position (neutral position) 51*a* to the first drive position 51*b*. It follows that the lift arm cylinders 14 retract to lower the lift arms 10.

When the work operation lever 9 is pivoted rearward (backward) (B) from the neutral position (N), the operation valve 54B supplies pilot pressure fluid to the lift arm control valve 51 via the pilot pressure fluid passage 44B, and the spool of the lift arm control valve 51, upon receipt of the pilot pressure of the pilot pressure fluid, moves from the stop position (neutral position) 51*a* to the second drive position 51*c*. It follows that the lift arm cylinders 14 extend to raise the lift arms 10.

When the work operation lever 9 is pivoted rightward (R) from the neutral position (N), the operation valve 54C supplies pilot pressure fluid to the attachment control valve 52 via the pilot pressure fluid passage 45A, and the spool of the attachment control valve 52, upon receipt of the pilot pressure of the pilot pressure fluid, moves from the stop position (neutral position) 52*a* to the first drive position 52*b*. It follows that the attachment cylinders 15 extend to cause the work attachment 16 to swing diagonally rearward and downward with respect to the lift arms 10 (in the anticlockwise direction in left side view).

When the work operation lever 9 is pivoted leftward (L) from the neutral position (N), the operation valve 54D supplies pilot pressure fluid to the attachment control valve 52 via the pilot pressure fluid passage 45B, and the spool of the attachment control valve 52, upon receipt of the pilot pressure of the pilot pressure fluid, moves from the stop position (neutral position) 52*a* to the second drive position 52*c*. It follows that the attachment cylinders 15 retract to cause the work attachment 16 to swing diagonally forward and upward with respect to the lift arms 10 (in the clockwise direction in left side view).

The AUX control valve 53 is connected to the proportional solenoid valves 55A and

55B via pilot pressure fluid passages 46A and 46B. Each of the proportional solenoid valves 55A and 55B opens when the solenoid is energized by electric current (control signal) outputted form the controller 20, and supplies fluid from the hydraulic pump P2 to the AUX control valve 53 via a corresponding pilot pressure fluid passage 46A or 46B, as pilot pressure fluid for control of the spool.

When the AUX switch 18 is in the OFF position, the controller 20 does not output electric current (control signal) to the solenoid of the proportional solenoid valve 55A or the solenoid of the proportional solenoid valve 55B, and therefore the proportional solenoid valves 55A and 55B are both closed. It follows that, since the spool of the AUX control valve 53 is not receiving pilot pressure in the first direction toward the first drive position 53*b* or in the second direction toward the second drive position 53*c*, the spool is held in the stop position (neutral position) 53*a* by the biasing force of a spring.

When the AUX switch 18 is in the ON position (specifically, when the AUX switch 18 is in the first ON position or the second ON position), the controller 20 outputs electric current (control signal) to the solenoid of a corresponding one of the proportional solenoid valves 55A and 55B to cause the corresponding one of the proportional solenoid valves 55A and 55B to open. It follows that the spool of the AUX control valve 53 receives the pilot pressure in the first direction or the second direction, and that the spool is brought into the first drive position 53*b* or the second drive position 53*c*.

Note that the controller 20 is capable of changing the opening of the proportional solenoid valve 55A or 55B by, for example, changing the duty ratio of the electric current supplied to the proportional solenoid valve 55A or 55B. This makes it possible to adjust the amount of pilot pressure fluid to the spool of the AUX control valve 53 to adjust the amount of hydraulic fluid supplied from the AUX control valve 53 to the AUX ports 11. Such a method makes it also possible to adjust the rate of change in the opening of the proportional solenoid valve 55A or 55B to adjust the speed of movement of the spool of the AUX control valve 53 between the stop position 53*a* and the first drive position 53*b* or between the stop position 53*a* and the second drive position 53*c*, to adjust the rate of change (speed of change) in the amount of hydraulic fluid supplied from the AUX control valve 53 to the AUX ports 11.

As has been discussed, the controller 20 controls, in response to, for example, the operation of the AUX switch 18, electric current supplied to the solenoids of the proportional solenoid valves 55A and 55B to control the position (amount of movement), the direction of movement, the speed of movement, and/or the like of the spool of the AUX control valve 53, control the degree of opening of the ports of the AUX control valve 53 that are in communication with the AUX hydraulic circuit 49, and control the flow rate, the direction of flow, a rate of change in flow rate (speed of change in flow rate), and/or the like of hydraulic fluid supplied from the AUX control valve 53 via the AUX hydraulic circuit 49 to the AUX port(s) 11 (and the work attachment 16 fluidly connected to the AUX port(s) 11).

The AUX switch 18 may be, for example, a dial, and may be configured such that the first ON position and the second ON position are fully turned positions and that an operation amount (the degree to which the dial is turned) which can vary between the stop position and the first ON position or between the stop position and the second ON position is inputted into the controller 20, so that the amount of hydraulic fluid supplied from the AUX control valve 53 to the AUX ports 11 can be adjusted according to the operation amount of the AUX switch 18.

The AUX control valve 53 includes six ports: inlet ports 60 and 61, inlet/outlet ports 62 and 63, and tank ports 64 and 65. The AUX control valve 53, when in the stop position 53*a*, receives hydraulic fluid delivered by the hydraulic pump PI at the inlet port 60, and discharges the fluid into the drain fluid passage 41*c* via the tank port 64 without supplying the fluid to the AUX ports 11.

The AUX control valve 53, when in the first drive position 53*b* or the second drive position 53*c*, receives hydraulic fluid delivered by the hydraulic pump PI at the inlet port 61, supplies the hydraulic fluid to the AUX ports 11 from one of the inlet/outlet ports 62 and 63 via a corresponding one of the fluid supply/discharge passages 41*h* or 41*i* that is connected to the one of the inlet/outlet ports 62 and 63, receives hydraulic fluid discharged from the AUX ports 11 via the other of the fluid supply/discharge passages 41*h* and 41*i* and the other of the inlet/outlet ports 62 and 63, and discharges the hydraulic fluid to the bypass fluid passage 41*b* via the tank port 64.

When the flow switch 19 is switched to the high flow position (when the high flow mode (increased flow rate mode) is selected), the hydraulic pump P3 delivers hydraulic fluid to increase the flow rate of hydraulic fluid supplied to the AUX actuator(s). A fluid delivery passage 43 extends from the delivery port of the hydraulic pump P3 and is connected to one of the fluid supply/discharge passages 41*h* and 41*i* (in the present embodiment, connected to the fluid supply/discharge passage 41*h*) at a junction 47.

The fluid delivery passage 43 is provided with a high flow valve (increase valve) 56 at an intermediate portion thereof. The high flow valve 56 is a two-way switching valve switchable between a normal flow position 56*a* and a high flow position 56*b* according to whether the valve receives pilot pressure or not.

The high flow valve 56, when in the normal flow position 56*a*, does not allow hydraulic fluid delivered by the hydraulic pump P3 to flow to the junction 47 and allows the hydraulic fluid to flow to the hydraulic fluid tank 29. Therefore, the AUX actuator in fluid connection with the AUX ports 11 here is supplied with hydraulic fluid at a normal flow rate which is composed only of the fluid delivered by the hydraulic pump P1.

The high flow valve 56, when in the high flow position 56*b*, allows hydraulic fluid delivered by the hydraulic pump P3 to flow from the fluid delivery passage 43 to a fluid increasing passage 43*a* downstream of the high flow valve 56, so that the hydraulic fluid merges with a flow of hydraulic fluid in the fluid supply/discharge passage 41*h* via the junction 47. Therefore, the AUX actuator in fluid connection with the AUX ports 11 here is supplied with hydraulic fluid at an increased flow rate (at high flow rate) composed of the fluid flow from the hydraulic pump PI and the fluid flow from the hydraulic pump P3.

Note that the fluid increasing passage 43*a* is provided with, at an intermediate portion thereof between the high flow valve 56 and the junction 47, a check valve 48 to prevent fluid from flowing reversely from the fluid supply/discharge passage 41*h* to the hydraulic pump P3.

When a pressure receiver 56*c* receives fluid discharged from the switching solenoid valve 57 as pilot pressure fluid, the high flow valve 56 is switched to the high flow position 56*b*. When the pressure receiver 56*c* does not receive the pilot pressure fluid from the switching solenoid valve 57, the high flow valve 56 is held in the normal flow position 56*a* by the biasing force of a spring.

The switching solenoid valve 57 is biased to a close position 57*a* by a spring force and, when the solenoid is energized by electric current from the controller 20, is switched to an open position 57*b*.

The switching solenoid valve 57, when in the close position 57*a*, closes the inlet port connected to the branch fluid passage 42*c*, and discharges fluid returned from the pressure receiver 56*c* of the high flow valve 56 to the hydraulic fluid tank 29. Therefore, the pressure receiver 56*c* of the high flow valve 56 is not supplied with pilot pressure fluid, and the high flow valve 56 is in the normal flow position 56*a* (non-increasing position).

The switching solenoid valve 57, when in the open position 57*b*, receives hydraulic fluid delivered by the hydraulic pump P2 via the branch fluid passage 42*c*, and supplies the hydraulic fluid to the pressure receiver 56*c* of the high flow valve 56 as pilot pressure fluid.

Therefore, the pressure receiver 56*c* of the high flow valve 56 is supplied with pilot pressure fluid, and the high flow valve 56 is in the high flow position 56*b* (increasing position).

When the flow switch 19 is in the normal flow position (when the normal flow mode (normal flow rate mode) is selected), the controller 20 does not output electric current (control signal) for energization of the solenoid of the switching solenoid valve 57 to the solenoid. With this, the switching solenoid valve 57 is in the close position 57*a*, and the high flow valve 56 is in the normal flow position 56*a*. That is, there is no flow of hydraulic fluid from the high flow valve 56 to the junction 47, and therefore hydraulic fluid flows at a normal flow rate (normal flow) between the AUX control valve 53 and the AUX actuator.

When the flow switch 19 is in the high flow position (when the high flow mode is selected), the controller 20 outputs electric current (control signal) for energization of the solenoid of the switching solenoid valve 57 to the solenoid. With this, the switching solenoid valve 57 is in the open position 57*b*, and the high flow valve 56 is in the high flow position 56*b*. That is, fluid delivered by the hydraulic pump P3 flows from the high flow valve 56 to the junction 47, and hydraulic fluid flows at an increased flow rate (high flow) between the AUX control valve 53 and the AUX actuator.

Figure 6:
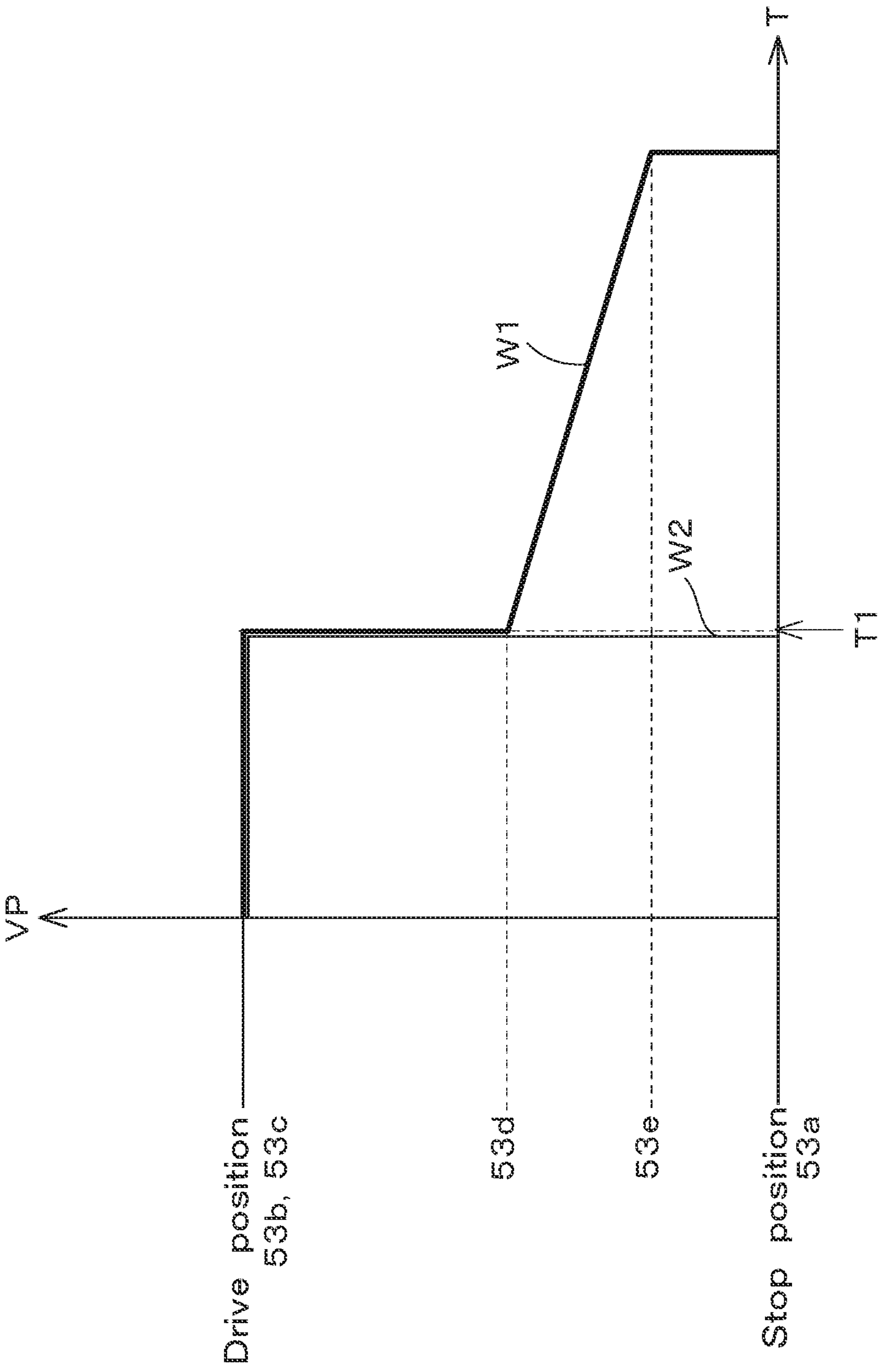
FIG. 6 shows position change characteristics of the spool of an AUX control valve.

The controller 20 controls the speed of movement of the spool of the AUX control valve 53 between the stop position 53*a* and the drive position 53*b* or 53*c* such that the speed differs between when the normal flow mode (normal flow rate mode) is selected and when the high flow mode (increased flow rate mode) is selected. FIG. 6 shows a position change characteristics curve W1 for the spool of the AUX control valve 53 obtained when the high flow mode is selected (when the high flow valve 56 is in the high flow position 56*b*) and a position change characteristics curve W2 for the spool of the AUX control valve 53 obtained when the normal flow mode is selected (when the high flow valve 56 is in the normal flow position 56*a*). The horizontal axis "T" represents time, whereas the vertical axis "VP" represents valve position, i.e., the position of the spool.

In FIG. 6, at points before point T1, the AUX switch 18 is in the ON position (in the first ON position or the second ON position) (for example, in the case where the AUX switch 18 is a dial, the dial is turned to the maximum degree from the OFF position (the operation amount is maximum)), and the spool of the AUX control valve 53 is in the drive position 53*b* or 53*b*.

The AUX switch 18 is brought into the OFF position (the operation amount is zero) at point T1. When the normal flow mode is selected, the controller 20 at point T1 immediately stops (or rapidly reduces) the supply of electric current to a corresponding one of the proportional solenoid valves 55A and 55B so that electric current supplied to each of the proportional solenoid valves 55A and 55B is zero. With this, as indicated by the characteristics curve W2, the spool of the AUX control valve 53 moves from the drive position 53*b* or 53*c* to the stop position 53*a* at once.

On the contrary, when the high flow mode is selected, the controller 20, at and after point T1, gradually reduces the supply of electric current to a corresponding one of the proportional solenoid valves 55A and 55B so that electric current supplied to each of the proportional solenoid valves 55A and 55B is zero. With this, as indicated by the characteristics curve W1, the spool of the AUX control valve 53 gradually moves from the drive position 53*b* or 53*c* to the stop position 53*a*.

That is, the controller 20 controls the speed of movement of the spool of the AUX control valve 53 (speed of switching of the AUX control valve 53) from the drive position 53*b* or 53*c* to the stop position 53*a* such that the speed is lower when the high flow mode is selected than when the normal flow mode is selected. In other words, the time taken for the spool of the AUX control valve 53 to move from the drive position 53*b* or 53*c* to the stop position 53*a* is longer when the high flow mode is selected than when the normal flow mode is selected.

Thus, when the AUX switch 18 is brought into the OFF position, in the case of the normal flow mode, the AUX actuator rapidly slows down to stop (substantially suddenly stops). Thus, the AUX actuator stops in quick response to the operation to turn off the AUX switch 18. On the contrary, in the case of the high flow mode, the AUX actuator gradually slows down to stop (takes some time to stop), reducing the shock that would otherwise occur upon sudden stoppage of the flow of hydraulic fluid flowing at an increased flow rate.

Note that the speed of movement of the spool of the AUX control valve 53 may be reduced in various manners, provided that the speed of movement is reduced such that such a shock can be reduced when the high flow mode is selected. For example, the characteristics curve W1 as shown in FIG. 6 indicates that, when the high flow mode is selected, the movement of the spool from the drive position 53*b* or 53*c* to an intermediate position 53*d* and the movement of the spool from an intermediate position 53*e* to the stop position 53*a* are rapid movement as with the movement of the spool from the drive position 53*b* or 53*c* to the stop position 53*a* during the normal flow mode (movement takes little time), whereas the speed of movement of the spool from the intermediate position 53*d* to the intermediate position 53*e* is reduced (the rate of change in position of the spool per unit time is reduced). However, for example, when the high flow mode is selected, the position of the spool may be changed from the drive position 53*b* or 53*c* to the stop position 53*a* at a constant rate of change.

Note that the following arrangement may be used: when the AUX switch 18 is switched from the OFF position to the ON position to start the AUX actuator, that is, when the spool of the AUX control valve 53 moves from the stop position 53*a* to the drive position 53*b* or 53*c*, the position of the spool changes rapidly both when the normal flow mode is selected and when the high flow mode is selected so that the AUX actuator is started in quick response to the operation of the AUX switch 18.

Additionally or alternatively, the following arrangement may be used: the characteristics in which the position of the spool changes when the AUX actuator is started and stopped based on switching of the AUX switch 18 as discussed above are set to initial characteristics (default characteristics) for driving of the AUX actuator; and the characteristics are changed from the initial characteristics according to the type, specifications, and/or the like of the work attachment 16. This will be described later.

The following description discusses screens displayed by the display 22 and manners in which a work attachment is controlled relating to each screen, with reference to FIGS. 7 to 11.

Figure 8:
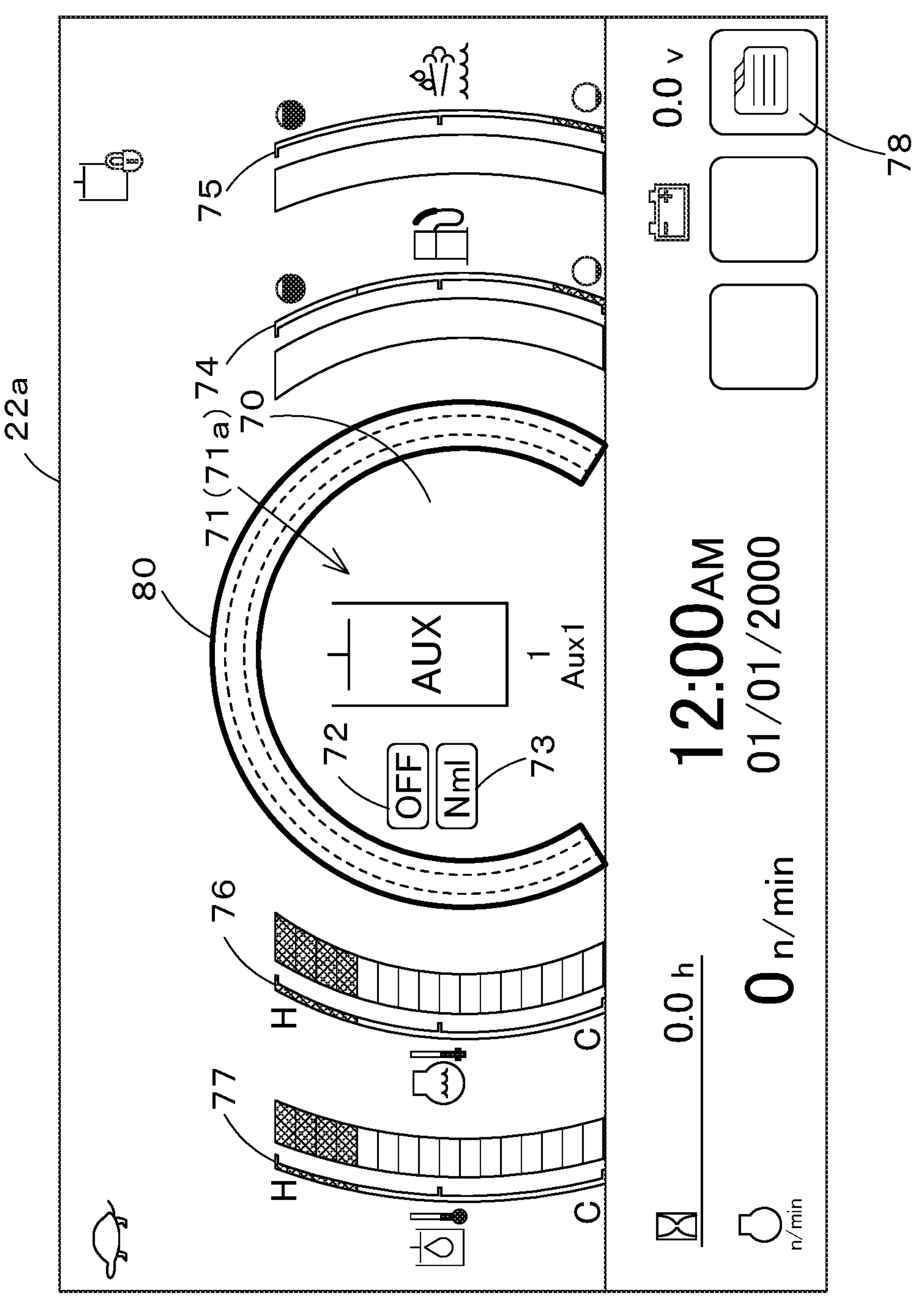
FIG. 8 illustrates an instrument panel screen when the hydraulic pressure gauge is turned off.

FIGS. 7 and 8 illustrate the instrument panel screen 22*a*. The display 22 displays the instrument panel screen 22*a* as an initial screen. The instrument panel screen 22*a* displays one or more graphical meters, one or more icons, and one or more numerical values in digital form.

The instrument panel screen 22*a* includes, at a central portion thereof, an AUX status display area 70 substantially in the form of a circle. An attachment icon 71 which is a graphical representation of a work attachment 16 (the type of a work attachment 16) is displayed at a central portion of the AUX status display area 70 of the instrument panel screen 22*a*.

Figure 10:
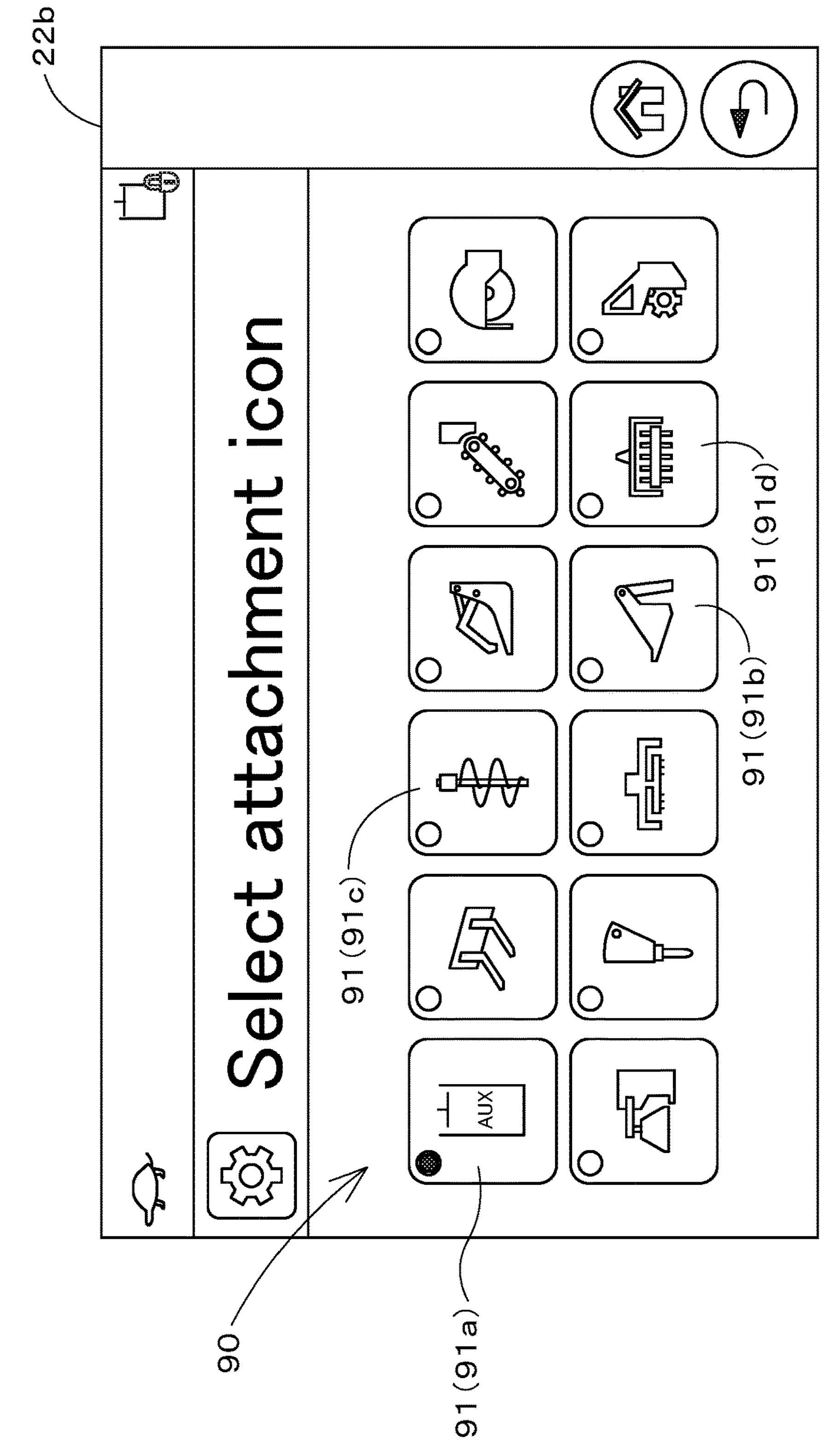
FIG. 10 illustrates an attachment selection screen.

The attachment icon 71 is one of attachment icons 91 included in an attachment list 90 displayed on an attachment selection screen 22*b* (described later) displayed in FIG. 10.

The following are displayed in the AUX status display area 70 on the left side of the attachment icon 71: an AUX switch status indicator 72 indicative of whether the AUX switch 18 is ON or OFF; and a flow mode indicator 73 indicative of whether the flow switch 19 is in a normal flow position or in a high flow position (whether the normal flow mode is selected or the high flow mode is selected). Note that the indicator(s) 72 and/or 73 may be replaced by touch switch(es) functioning as the AUX switch 18 and/or the flow switch 19.

In the instrument panel screen 22*a*, a hydraulic pressure gauge 80 substantially in the form of a circle is displayed such that the hydraulic pressure gauge 80 substantially surrounds the AUX status display area 70. The hydraulic pressure gauge 80 is divided into the following three ranges: a proper hydraulic pressure range 80*a*; a below-proper-hydraulic-pressure range 80*b* extending from the left end of the proper hydraulic pressure range 80*a* to the lower left end of the hydraulic pressure gauge 80; and an above-proper-hydraulic-pressure range 80*c* extending from the right end of the proper hydraulic pressure range 80*a* to the lower right end of the hydraulic pressure gauge 80.

The beginning of the hydraulic pressure gauge 80 at the lower left of the hydraulic pressure gauge 80 functions as a mark indicative of a hydraulic pressure of 0 (zero), and the end of the hydraulic pressure gauge 80 at the lower right of the hydraulic pressure gauge 80 functions as a mark indicative of the maximum hydraulic pressure that can be displayed on the hydraulic pressure gauge 80. Note that, although hydraulic pressure is expressed in MPa (megapascal) and the maximum hydraulic pressure is 40 MPa in the present embodiment, this is an example and does not imply any limitation. Also note that, in FIGS. 7 and 8, numerical values displayed on the instrument panel screen 22*a* are examples and do not imply any limitation, except for the elements described in the present specification.

The proper hydraulic pressure range 80*a* is a hydraulic pressure range defined by the minimum proper hydraulic pressure PL and the maximum proper hydraulic pressure PU. Specifically, the minimum proper hydraulic pressure PL is a boundary between the proper hydraulic pressure range 80*a* and the below-proper-hydraulic-pressure range 80*c*, and the maximum proper hydraulic pressure PU is a boundary between the proper hydraulic pressure range 80*a* and the above-proper-hydraulic-pressure range 80*c*.

The proper hydraulic pressure range 80*a*, the below-proper-hydraulic-pressure range 80*b*, and the above-proper-hydraulic-pressure range 80*c* have, for example, different colors and/or different brightnesses so that they are visually distinctive from each other. The ranges 80*a*, 80*b*, and 80*c* may be made visually distinctive from each other by any method, provided that they are easily visually recognizable to the operator.

The minimum proper hydraulic pressure PL and the maximum proper hydraulic pressure PU are determined based on parameter(s) included in the information DA and/or the information DB relating to a work attachment 16 acquired by the controller 20 as described earlier. That is, the proper hydraulic pressure range 80*a* of the hydraulic pressure gauge 80 is set for each work attachment 16 (for each work attachment 16 including AUX actuator(s)) attached to the working device 4 (lift arms 10).

As described earlier with reference to FIG. 3, a work attachment 16 including an AUX actuator is provided with the hydraulic pressure detector 16*a* to detect hydraulic pressure on the AUX actuator. The work attachment 16 issues the detected hydraulic pressure signal PS indicative of the hydraulic pressure detected by the hydraulic pressure detector 16*a*, and the communication device 23 of the working machine 1 is capable of receiving the detected hydraulic pressure signal PS. Note that another way to acquire the hydraulic pressure status of the work attachment 16 would be to detect hydraulic pressure at an appropriate point in the work hydraulic system (work hydraulic circuit) 40 of the working machine 1. Therefore, the hydraulic pressure indicated as a current hydraulic pressure CP on the hydraulic pressure gauge 80 is not necessarily the one detected by the hydraulic pressure detector 16*a* provided on the work attachment 16.

As illustrated in FIG. 7, the controller 20 causes an indicator 81 to be displayed on the hydraulic pressure gauge 80 based on the detected hydraulic pressure signal PS from the work attachment 16 received at the communication device 23. The indicator 81 indicates the current hydraulic pressure on the AUX actuator.

The indicator 81 is in the form of a curve having a certain width, extending from the beginning of the hydraulic pressure gauge 80 indicating a hydraulic pressure of 0 (zero) (MPa) along the hydraulic pressure gauge 80 in the form of a curve to the position of the mark on the hydraulic pressure gauge 80 that indicates the current hydraulic pressure CP represented by the detected hydraulic pressure signal PS. That is, the mark on the hydraulic pressure gauge 80 that corresponds to the end of the indicator 81 indicates the current hydraulic pressure CP. In the present embodiment, the end of the indicator 81 is located somewhat short of the mark indicative of 20 MPa on the hydraulic pressure gauge 80. Therefore, the operator who sees the indicator 81 would recognize that the current hydraulic pressure CP is less than 20 MPa.

When the current hydraulic pressure CP is within the proper hydraulic pressure range 80*a*, the indicator 81 has different colors in the respective ranges below and above the position representing the minimum proper hydraulic pressure PL, and the range from the minimum proper hydraulic pressure PL to the end of the indicator 81 that indicates the current hydraulic pressure CP has a single color representing the proper hydraulic pressure range 80*a*. The operator who sees such an indicator 81 would understand that the current hydraulic pressure CP is within the proper hydraulic pressure range 80*a*.

When the current hydraulic pressure CP is within the below-proper-hydraulic-pressure range 80*b*, the range from the beginning of the indicator 81 that indicates a hydraulic pressure of 0 (zero) to the end of the indicator 81 that indicates the current hydraulic pressure CP has a single color representing the below-proper-hydraulic-pressure range 80*b*. The operator who sees such an indicator 81 would understand that the current hydraulic pressure CP is within the below-proper-hydraulic-pressure range 80*b*, When the current hydraulic pressure CP is within the above-proper-hydraulic-pressure range 80*c*, the indicator 81 has three colors in the respective ranges defined by the position representing the minimum proper hydraulic pressure PL and the position representing the maximum proper hydraulic pressure PU, and the range from the position representing the maximum proper hydraulic pressure PU to the end of the indicator 81 that indicates the current hydraulic pressure CP has a color representing the above-proper-hydraulic-pressure range 80*c*. The operator who sees such an indicator 81 would understand that the current hydraulic pressure CP is within the above-proper-hydraulic-pressure range 80*c*, Thus, the operator recognizes the hydraulic pressure status of the AUX actuator by looking at the indicator 81 displayed along the hydraulic pressure gauge 80, and switches the AUX switch 18 and/or switches the flow switch 19. For example, when the current hydraulic pressure CP indicated by the end of the indicator 81 is within the below-proper-hydraulic-pressure range 80*b* or within the above-proper-hydraulic-pressure range 80*c*, the operator would perform the operation of, for example, switching the flow switch 19 to cause the current hydraulic pressure CP to fall within the proper hydraulic pressure range 80*a*.

As has been discussed, the indicator 81 on the hydraulic pressure gauge 80 in FIG. 7 is substantially in the form of a curved bar graph extending from the beginning of the hydraulic pressure gauge 80 indicating a hydraulic pressure of zero along the hydraulic pressure gauge 80 to a length corresponding to the current hydraulic pressure CP. Note, however, that the manner in which the indicator indicating the current hydraulic pressure CP is displayed on the hydraulic pressure gauge is not limited as such.

Figure 9:
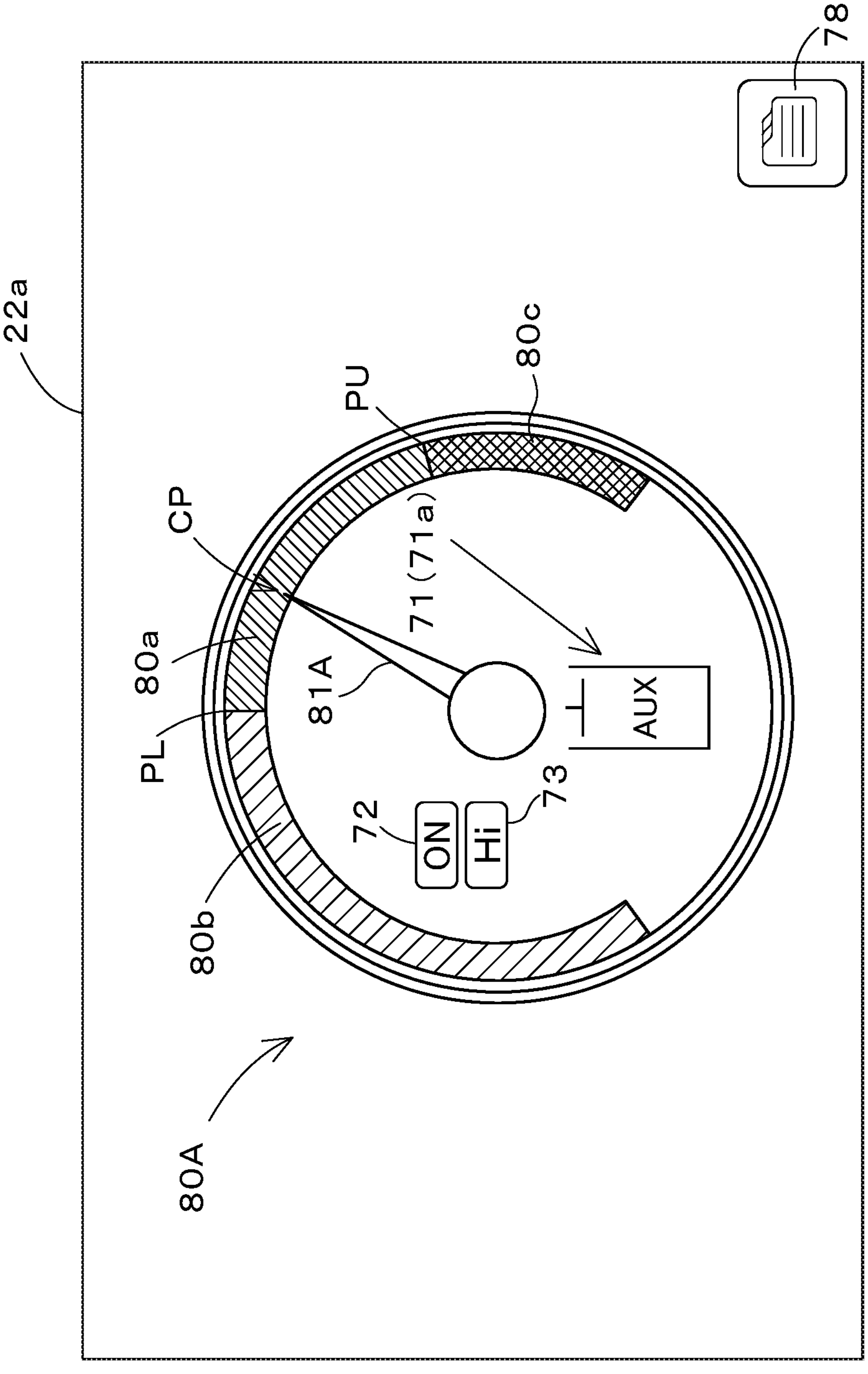
FIG. 9 illustrate an instrument panel screen which displays another hydraulic gauge.

For example, a hydraulic pressure gauge 80A displayed on the instrument panel screen 22*a* in FIG. 9 has a proper hydraulic pressure range 80*a*, a below-proper-hydraulic-pressure range 80*b*, and an above-proper-hydraulic-pressure range 80*c* which are defined by the minimum proper hydraulic pressure PL and the maximum proper hydraulic pressure PU included in the information DA or DB, similarly to the hydraulic pressure gauge 80 in FIG. 7. However, an indicator 81A indicating the current hydraulic pressure is similar to the indicator of a hydraulic gauge as a standard, individual instrument, and the indicator 81A is displayed in a simpler manner than the indicator 81 on the hydraulic pressure gauge 80.

Note that there may be cases in which the work attachment 16 is provided with a hydraulic pressure gauge that indicates the current hydraulic pressure on the AUX actuator. However, during work, the surrounding area of the work attachment 16 is likely to be dusty and, depending on the position of the work attachment 16, the hydraulic pressure gauge on the work attachment 16 may be difficult to recognize by the operator within the cabin 3. With the working machine 1 of the present application, the indicator 81 indicating the current hydraulic pressure CP is displayed on the hydraulic pressure gauge 80 displayed on the instrument panel screen 22*a* within the cabin 3, and the operator who sees the indicator 81 can check the hydraulic pressure status of the AUX actuator without the influence of dust or the like in the surrounding area of the working device 4.

On the instrument panel screen 22*a*, a fuel gauge 74 in the form of a curve extending along a right portion of the hydraulic pressure gauge 80 is displayed on the right side of the hydraulic pressure gauge 80, and a cooling water gauge 75 in the form of a curve extending along the fuel gauge 74 is displayed on the right side of the fuel gauge 74.

On the instrument panel screen 22*a*, a cooling water temperature gauge 76 in the form of a curve extending along a left portion of the hydraulic pressure gauge 80 is displayed on the left side of the hydraulic pressure gauge 80, and a hydraulic fluid temperature gauge 77 in the form of a curve extending along the cooling water temperature gauge 76 is displayed on the left side of the cooling water temperature gauge 76.

A storage icon 78 is displayed at the lower right of the instrument panel screen 22*a*. Upon touching the storage icon 78 with the operator's finger, the screen displayed by the display 22 is switched from the instrument panel screen 22*a* to the attachment selection screen 22*b* illustrated in FIG. 10. The attachment selection screen 22*b* displays the attachment list 90 including attachment icons 91. The attachment icons 91 of the attachment list 90 include, for example, an AUX default icon 91*a* representing an AUX default, a bucket icon 91*b* representing a bucket 16A, an auger icon 91*c* representing an earth auger 16C, and a rake icon 91*d* representing a rake (powered rake).

Note that, because the number of the attachment icons 91 which can be displayed on a single screen is limited, the attachment selection screen 22*b* may be switchable to another attachment selection screen 22*b* displaying another attachment list 90 including other one or more attachment icons 91. For example, the another attachment list 90 may include an attachment icon 91 representing a sweeper 16B not illustrated in FIG. 10.

The positions and/or the order of the attachment icons 91 may be changeable within a single attachment list 90 on a single attachment selection screen 22*b*. The positions of the attachment icons 91 may be changeable between different attachment lists 90 on different attachment selection screens 22.

As described earlier with reference to FIGS. 3 and 6, the memory 21 stores pieces of information DA for respective types of work attachments 16. FIG. 12 shows an example of a list of pieces of information DA for respective types of work attachments 16 stored in the memory 21. The following discusses a configuration of the pieces of information DA stored in the memory 21 with reference to FIG. 12.

The list in FIG. 12 includes a piece of information DA about an AUX default, a piece of information DA2 about the bucket 16A, a piece of information DA3 about the sweeper 16B, a piece of information DA4 about the earth auger 16C, and a piece of information DA5 about the rake (powered rake), as the pieces of information DA for the respective types of work attachments 16. The list may also include pieces of information DA for respective other types of work attachments 16, but the pieces of information DA1 to DA5 are only illustrated as examples here.

The pieces of information DA for the respective types of work attachments 16 each at least include identification information Di and hydraulic pressure characteristics information (hydraulic pressure gauge information) Dp. The identification information Di at least includes the type of the work attachment 16. Note that the identification information Di may also include the specifications (such as the model) of the work attachment 16, optional equipment on the work attachment 16, and/or the like, and work attachments 16 of the same type may be allocated with different pieces of information DA depending on the specifications and/or the equipment.

The hydraulic pressure characteristics information (hydraulic pressure gauge information) Dp at least includes AUX information Da. The AUX information Da indicates whether or not the work attachment 16 includes AUX actuator(s). Note that the AUX information Da in the information DA1 for the AUX default does not indicate whether or not AUX actuator(s) is/are included, but is the information relating to displaying the hydraulic pressure gauge 80 when the AUX switch 18 is ON or not displaying the hydraulic pressure gauge 80 when the AUX switch 18 is OFF, as noted in FIG. 12.

If the AUX information Da of a piece of information DA indicates that AUX actuator(s) is/are included ("YES" in FIG. 12) like the pieces of information DA3 to DA5 in FIG. 12, the hydraulic pressure characteristics information (hydraulic pressure gauge information) Dp in the piece of information DA further includes information relating to proper hydraulic pressure for the work attachment 16, specifically, the minimum proper hydraulic pressure PL and the maximum proper hydraulic pressure PU which are pieces of numerical information (parameters) that define a proper hydraulic pressure range for the AUX actuator of the work attachment 16, and the piece of information DA includes operation characteristics information (switching speed information) Dm which is information relating to the speed of movement of the spool of the AUX control valve (work-attachment-drive control valve) 53 (hereinafter may be referred to as "speed of switching of the AUX control valve 53") corresponding to the work attachment 16.

If the selected work attachment 16 includes no AUX actuators like the piece of information DA2 for the bucket 16A in FIG. 12, the AUX information Da of the hydraulic pressure characteristics information (hydraulic pressure gauge information) Dp in the piece of information DA indicates that no AUX actuators are included ("NO" in FIG. 12), the hydraulic pressure characteristics information Dp does not include information relating to proper hydraulic pressure such as the minimum proper hydraulic pressure PL and the maximum proper hydraulic pressure PU, and the piece of information DA does not include the operation characteristics information (switching speed information) Dm.

As has been discussed, the AUX information Da in each of the pieces of information DA for the respective work attachments 16, except for the piece of information DA1 for the AUX default, is information indicative of whether or not the work attachment 16 includes AUX actuator(s), and is also information indicative of whether or not to cause the hydraulic pressure gauge 80 (see FIG. 7) to be displayed on the instrument panel screen 22*a* (described later in detail).

That is, the AUX information Da indicating that the AUX actuator(s) is/are included is information indicating that the hydraulic pressure gauge 80 is to be displayed on the instrument panel screen 22*a*. On the contrary, the AUX information Da indicating that no AUX actuators are included is information indicating that the hydraulic pressure gauge 80 is not to be displayed on the instrument panel screen 22*a*.

That is, if the AUX information Da indicates that AUX actuator(s) is/are included, this means that the hydraulic pressure gauge 80 is desired to be displayed, and therefore the hydraulic pressure characteristics information Dp includes the parameter(s) indicative of the minimum proper hydraulic pressure PL and/or the maximum proper hydraulic pressure PU which are preferably set to divide the hydraulic pressure gauge 80. On the contrary, if the AUX information Da indicates that no AUX actuators are included, this means that the hydraulic pressure gauge 80 does not need to be displayed, and therefore the hydraulic pressure characteristics information Dp does not include the parameters indicative of the minimum proper hydraulic pressure PL and/or the maximum proper hydraulic pressure PU which are preferably set to divide the hydraulic pressure gauge 80.

The speed of switching of the AUX control valve 53 from the stop position 53*a* to the drive position 53*b* or 53*c* (the speed of movement of the spool) in response to switching the AUX switch 18 from OFF to ON determines the manner in which the work attachment 16 operates (accelerates) when started up (such a manner may be hereinafter referred to as "operation of the work attachment 16 at startup"). The speed of switching of the AUX control valve 53 from the drive position 53*b* or 53*c* to the stop position 53*a* (the speed of movement of the spool) in response to switching the AUX switch 18 from ON to OFF determines the manner in which the work attachment 16 operates (decelerates) when stopped (such a manner may be hereinafter referred to as "operation of the work attachment 16 at stopping"). The operation characteristics information Dm includes: startup operation information Dm1 relating to the speed of switching of the AUX control valve 53 for when the work attachment 16 is started (when the AUX switch 18 is switched from OFF to ON); and stop operation information Dm2 relating to the speed of switching of the AUX control valve 53 for when the work attachment 16 is stopped (when the AUX switch 18 is switched from ON to OFF).

The operation of the work attachment 16 at startup and the operation of the work attachment 16 at stopping may each be set at two or more levels. For example, in the embodiment shown in FIG. 12, with respect to the operation of the work attachment 16 at startup (the operation from when the work attachment 16 is in the stopped state to when the work attachment 16 is driven at maximum speed), the following two levels can be set: "quick start" in which the driving speed increases rapidly to reach the maximum driving speed; and "slow start" in which the driving speed slowly increases to reach the maximum driving speed. Furthermore, for example, the level "moderate start" or the like in which the driving speed increases at moderate speed to reach the maximum driving speed, between the acceleration corresponding to the "quick start" and the acceleration corresponding to the "slow start", may be added so that the three operation levels can be set for the operation of the work attachment 16 at startup.

For example, in the embodiment in FIG. 12, with regard to the operation of the work attachment 16 at stopping (the operation from when the work attachment 16 is driven at maximum speed to when the work attachment 16 is stopped), the following two levels can be set: "quick stop" in which the driving speed decreases rapidly to reach the stopped state; and "slow stop" in which the driving speed slowly decreases to reach the stopped state. Furthermore, for example, the level "moderate stop" or the like in which the driving speed decreases at moderate speed to reach the stopped state, between the deceleration corresponding to the "quick stop" and the deceleration corresponding to the "slow stop", may be added so that the three operation levels can be set for the operation of the work attachment 16 at stopping.

Furthermore, some work attachments 16 operate, when started and/or stopped, in different manners depending on whether the flow mode determined by the position of the flow switch 19 is the normal flow mode or the high flow mode.

In view of such circumstances, in the embodiment shown in FIG. 12, with regard to the speed of switching of the AUX control valve 53 for startup of the work attachment 16, at least two levels can be set which correspond to the "quick start" and "slow start" of the work attachment 16, respectively, in each of the normal flow and high flow modes. Also with regard to the speed of switching of the AUX control valve 53 for stopping the work attachment 16, at least two levels can be set which correspond to the "quick stop" and "slow stop" of the work attachment 16, respectively, in each of the normal flow and high flow modes.

Accordingly, the startup operation information Dm1 indicates the level of the speed of switching of the AUX control valve 53 (the speed of movement of the spool) corresponding to one operation level such as the "quick start" or "slow start" (or "moderate start") suitable as the level of the operation of the work attachment 16 at startup, according to whether the flow mode is the normal flow mode or the high flow mode. The stop operation information Dm2 indicates the level of the speed of switching of the AUX control valve 53 (the speed of movement of the spool) corresponding to one operation level such as the "quick stop" or "slow stop" (or "moderate stop") suitable as the level of the operation of the work attachment 16 at stopping, according to whether the flow mode is the normal flow mode or the high flow mode.

The operator can, by selecting one of the attachment icons 91 on the attachment selection screen 22*b* displayed by the display 22 that corresponds to the work attachment 16 attached to the lift arms 10 (or to be attached to the lift arms 10) and touching the attachment icon 91, cause the controller 20 to select, from pieces of information DA stored in the memory 21, a piece of information DA about the work attachment 16 corresponding to the selected attachment icon 91 and acquire the piece of information DA.

Figure 11:
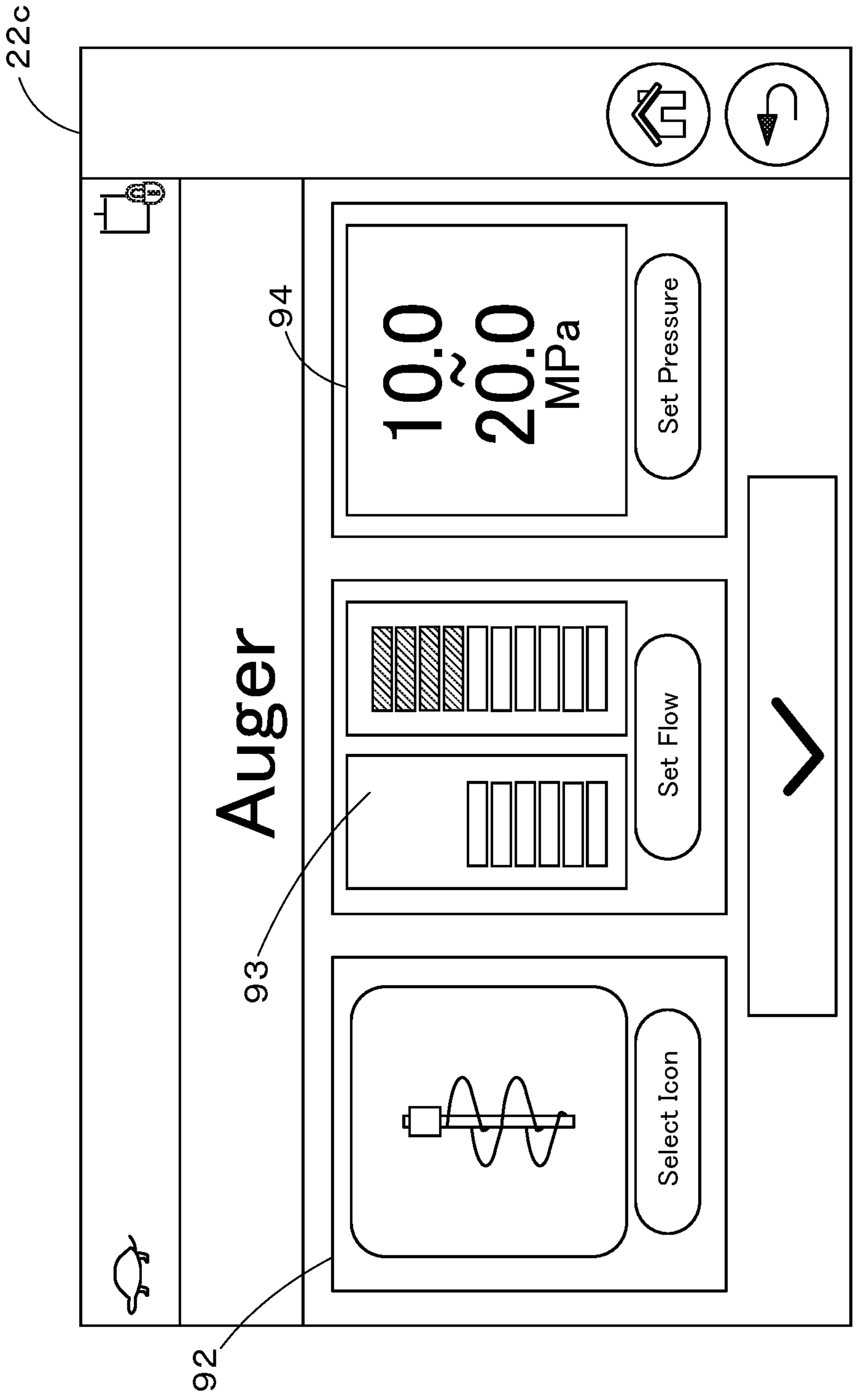
FIG. 11 is a parameter input screen for a selected attachment (earth auger).

Upon the operation of selecting the attachment icon 91 (upon touching the icon with a finger), the controller 20 changes the screen displayed by the display 22 to a parameter settings screen 22*c* as illustrated in FIG. 11. The parameter settings screen 22*c* displays an attachment icon 92 corresponding to the attachment icon 91 selected on the attachment selection screen 22*b* (in the present embodiment, an icon which is a graphical representation of the earth auger 16C corresponding to the selection of the auger icon 91*c*), a flow rate setting icon 93 to allow settings of proper flow rate of hydraulic fluid supplied to the AUX actuator, and a hydraulic pressure setting icon 94 to allow settings of a proper hydraulic pressure range of hydraulic fluid supplied to the AUX actuator.

The flow rate setting icon 93 and the hydraulic pressure setting icon 94 indicate predetermined numeric values if the piece of information DA includes the predetermined numeric values. The hydraulic pressure setting icon 94 indicates numeric values corresponding to the minimum proper hydraulic pressure PL and the maximum proper hydraulic pressure PU included in the hydraulic pressure characteristics information Dp. Note that the values of the minimum proper hydraulic pressure PL and the maximum proper hydraulic pressure PU in FIG. 11 are examples, and do not imply any limitation.

The operator can change the numeric values indicated by the hydraulic pressure setting icon 94 by, for example, pressing keys of an on-screen numeric keypad displayed on the parameter settings screen 22*c*. This makes it possible to update the minimum proper hydraulic pressure PL and the maximum proper hydraulic pressure PU included in the hydraulic pressure characteristics information Dp of the piece of information DA stored in the memory 21.

When the screen displayed by the display 22 is changed from the attachment selection screen 22*b* or the parameter settings screen 22*c* back to the instrument panel screen 22*a*, the instrument panel screen 22*a* displays, in the central area of the AUX status display area 70, an attachment icon 71 which is one of the attachment icons 91 in the attachment list 90 displayed on the attachment selection screen 22*b* that has been selected by the operator.

The attachment icon 71 indicates that the control of hydraulic fluid supply via the AUX ports 11 (control of driving of the attachment) is currently performed based on the piece of information DA about the work attachment 16 graphically represented by the attachment icon 71 (that is, based on the piece of information DA about the work attachment 16 selected by the operator from the attachment list 90).

If the operator selects an attachment icon 91 representative of a work attachment 16 including no AUX actuators such as the bucket icon 91*b* on the attachment selection screen 22*b*, the AUX information Da in the hydraulic pressure characteristics information (hydraulic pressure gauge information) Dp of the piece of information DA about the work attachment 16 acquired by the controller 20 from the memory 21 indicates that no AUX actuators are included.

If the AUX information Da is information indicating that no AUX actuators are included as described above, because such information also indicates that the hydraulic pressure gauge 80 is not to be displayed, the AUX switch status indicator 72 and the flow mode indicator 73 in the AUX status display area 70 and the hydraulic pressure gauge 80 are turned OFF on the instrument panel screen 22*a* as illustrated in FIG. 8.

If the operator selects an attachment icon 91 representative of a work attachment 16 including an AUX actuator such as the auger icon 91*c* on the attachment selection screen 22*b*, the AUX information Da in the piece of information DA about the work attachment 16 acquired by the controller 20 from the memory 21 indicates that an AUX actuator is included. In such a case, because the AUX information Da indicates that the hydraulic pressure gauge 80 is to be displayed, the AUX switch status indicator 72 and the flow mode indicator 73 in the AUX status display area 70 and the hydraulic pressure gauge 80 are turned ON as illustrated in FIG. 7.

The AUX switch status indicator 72 indicates the letters "ON" or "OFF" corresponding to ON or OFF of the AUX switch 18. The flow mode indicator 73 indicates the letters "Normal (Nml)" or "High (Hi)" corresponding to whether the position of the high flow valve 56 is the normal flow position 56*a* or the high flow position 56*b*.

Note that, in the case where the AUX switch 18 in the form of a touch switch is displayed instead of the AUX switch status indicator 72, the AUX switch 18 indicates "ON" while the AUX switch 18 is the OFF state and indicates "OFF" while the AUX switch 18 is in the ON state. In the case where the flow switch 19 in the form of a touch switch is displayed instead of the flow mode indicator 73, the flow switch 19 indicates "High flow (Hi)" during the normal flow mode and indicates "Normal flow (Nml)" during the high flow mode.

If the operator switches the AUX switch 18 from OFF to ON while the normal flow mode or the high flow mode is selected, the spool of the AUX control valve 53 moves from the stop position 53*a* to the drive position 53*b* or 53*c* at a speed (speed of switching) corresponding to the startup operation information Dm1 about the selected work attachment 16. The work attachment 16 is started such that the speed of driving of the work attachment 16 increases at a rate corresponding to the speed of movement of the spool.

If the operator switches the AUX switch 18 from ON to OFF while the normal flow mode or the high flow mode is selected, the spool of the AUX control valve 53 moves from the drive position 53*b* or 53*c* to the stop position 53*a* at a speed corresponding to the stop operation information Dm2 about the selected work attachment 16. The work attachment 16 stops such that the speed of driving of the work attachment 16 decreases at a rate corresponding to the speed of movement of the spool.

Upon touching the AUX default icon 91*a* on the attachment selection screen 22*b* by the operator, the controller 20 acquires the piece of information DA1 about the AUX default (initial setting) from the memory 21, and causes an AUX default icon 71*a* representative of the AUX default (initial setting) to be displayed in the AUX status display area 70 of the instrument panel screen 22*a* as illustrated in FIG. 7.

For example, in the case where the operator cannot find the attachment icon 91 representative of the work attachment 16 the operator wants to select in the attachment list 90, the operator may press the AUX default icon 91*a*. Note that the controller 20 may be configured or programmed to assume that the AUX default icon 91*a* is pressed and acquire the piece of information DA1 about the AUX default even if the operator does not press the AUX default icon 91*a*, provided that other attachment icons 91 are not pressed.

The operator may always select the AUX default regardless of what work attachment 16 is attached to the lift arms 10, so that the operator does not need to press the attachment icon 91 representative of an intended work attachment 16 in the attachment list 90 to retrieve a corresponding piece of information DA every time a work attachment 16 is attached to the lift arms 10.

The AUX information Da in the piece of information DA about the AUX default (initial setting) does not indicate that AUX actuator(s) is/are included or that no AUX actuators are included. The AUX information Da corresponds to ON/OFF of the AUX switch 18, as described earlier.

Specifically, on the basis of the AUX information Da in the piece of information DA1, the AUX switch status indicator 72, the flow mode indicator 73, and the hydraulic pressure gauge 80 are turned ON on the instrument panel screen 22*a* upon turning ON of the AUX switch 18, whereas the AUX switch status indicator 72, the flow mode indicator 73, and the hydraulic pressure gauge 80 are turned OFF on the instrument panel screen 22*a* upon turning OFF of the AUX switch 18.

As shown in FIG. 12, the hydraulic pressure characteristics information (hydraulic pressure gauge information) Dp in the piece of information DA1 about the AUX default (initial setting) includes a default value PL1 of the minimum proper hydraulic pressure PL and a default value PU1 of the maximum proper hydraulic pressure PU. The operation characteristics information Dm includes the levels of the speed of switching of the AUX control valve 53 (speed of movement of the spool) corresponding to the operation levels "quick start" and "quick stop" of the work attachment 16 for the normal flow mode and the "quick start" and "slow stop" of the work attachment 16 for the high flow mode (i.e., settings used to perform the control shown in FIG. 6).

Accordingly, in the case where the AUX default (initial setting) is selected by pressing the AUX default icon 91*a* on the attachment list 90, the AUX switch status indicator 72, the flow mode indicator 73, and the hydraulic pressure gauge 80 are turned OFF, provided that the AUX switch 18 is not turned ON. Upon switching the AUX switch 18 from OFF to ON, the AUX switch status indicator 72 indicating "ON" is turned on, the flow mode indicator 73 indicating "Normal flow" or "High flow" is turned on, and the hydraulic pressure gauge 80 is turned on. The work attachment 16 is "quickly started" regardless of whether the flow mode is the normal flow mode or the high flow mode.

Upon switching the AUX switch 18 from ON to OFF, the AUX switch status indicator 72, the flow mode indicator 73, and the hydraulic pressure gauge 80 are turned off. The work attachment 16 is "quickly stopped" if the flow mode is the normal flow mode, and is "slowly stopped" if the flow mode is the high flow mode.

As described earlier, the AUX information Da in the piece of information DA2 about the bucket stored in the memory 21 indicates that no AUX actuators are included ("NO" in FIG. 12) (that is, indicates that the hydraulic pressure gauge 80 is not to be displayed). Therefore, upon touching the bucket icon 91*b* on the attachment selection screen 22*b* by the operator, the controller 20 acquires the piece of information DA2 and, based on the piece of information DA2, turns off the AUX switch status indicator 72, the flow mode indicator 73, and the hydraulic pressure gauge 80 on the instrument panel screen 22*a*.

Note that the controller 20 may be configured or programmed to, in such circumstances, prevent the AUX switch 18 from being turned ON so that the spool of the AUX control valve 53 does not move from the stop position 53*a*.

As shown in FIG. 12, the AUX information Da in the piece of information DA3 about the sweeper 16B, the piece of information DA4 about the earth auger 16C, and the piece of information DA5 about the rake stored in the memory 21 each indicate that AUX actuator(s) is/are included ("YES" in FIG. 12) (indicate that the hydraulic pressure gauge 80 is to be displayed).

Accordingly, upon touching the attachment icon 91 representing the sweeper 16B, the attachment icon 91 representing the earth auger 16C (auger icon 91*c*), or the attachment icon 91 representing the rake (rake icon 91*d*) by the operator on the attachment selection screen 22*b*, the controller 20 acquires the piece of information DA3, DA4, or DA5 and, based on the piece of information, causes the icon 71 representing the corresponding work attachment 16 to be displayed on the instrument panel screen 22*a* and turns on the AUX switch status indicator 72, the flow mode indicator 73, and the hydraulic pressure gauge 80 on the instrument panel screen 22*a*.

When the piece of information DA3 about the sweeper 16B is selected and the icon 71 representing the sweeper 16B is displayed on the instrument panel screen 22*a*, the hydraulic pressure gauge 80 is displayed such that the proper hydraulic pressure range 80*a* is defined by the minimum proper hydraulic pressure PL2 and the maximum proper hydraulic pressure PU2 included in the hydraulic pressure characteristics information Dp in the piece of information DA3.

In such a case, upon switching the AUX switch 18 from OFF to ON by the operator, the work attachment 16 (sweeper 16B) is quickly started both in the normal flow mode and in the high flow mode, based on the startup operation information Dm1 in the piece of information DA3. On the contrary, upon switching the AUX switch 18 from ON to OFF, the work attachment 16 (sweeper 16B) stops slowly both in the normal flow mode and in the high flow mode, based on the stop operation information Dm2 in the piece of information DA3.

Specifically, when the controller 20 has acquired the piece of information DA1 about the AUX default, upon switching the AUX switch 18 from ON to OFF when the normal flow mode is selected, the work attachment 16 quickly stops. However, when the controller 20 has acquired the piece of information DA3 about the sweeper 16B, upon switching the AUX switch 18 from ON to OFF when the normal flow mode is selected, the work attachment 16 (sweeper 16B) slowly stops. This makes it possible to reliably sweep dust that would otherwise be likely to be left if the rotary brush of the sweeper 16B is quickly stopped.

When the piece of information DA4 about the earth auger 16C is selected and the icon 71 representing the earth auger 16C is displayed on the instrument panel screen 22*a,* the hydraulic pressure gauge 80 is displayed such that the proper hydraulic pressure range 80*a* is defined by the minimum proper hydraulic pressure PL3 and the maximum proper hydraulic pressure PU3 included in the hydraulic pressure characteristics information Dp in the piece of information DA4.

In such a case, upon switching the AUX switch 18 from OFF to ON by the operator, the work attachment 16 (earth auger 16C) is quickly started both in the normal flow mode and in the high flow mode, based on the startup operation information Dm1 in the piece of information DA4. Upon switching the AUX switch 18 from ON to OFF, the work attachment 16 (earth auger 16C) also quickly stops both in the normal flow mode and in the high flow mode, based on the stop operation information Dm2 in the piece of information DA4.

Specifically, when the controller 20 has acquired the piece of information DA1 about the AUX default, upon switching the AUX switch 18 from ON to OFF when the high flow mode is selected, the work attachment 16 slowly stops. However, when the controller 20 has acquired the piece of information DA4 about the earth auger 16C, upon switching of the AUX switch 18 from ON to OFF when the high flow mode is selected, the work attachment 16 (earth auger 16C) quickly stops.

Accordingly, the following is achieved. That is, in the case where the high flow mode is selected, when the AUX switch 18 is turned OFF to stop the earth auger 16D in order to pull up the earth auger 16D from the ground and reversely rotate the earth auger 16D, the soil in the channels of the screw cannot be thrown off well if the AUX default is selected because the earth auger 16C stops slowly when the AUX default is selected. On the contrary, when the piece of information DA4 is acquired, the earth auger 16C quickly stops, so that the soil comes off well the screw and the auger shaft. In addition, upon turning ON the AUX switch 18 after the earth auger 16D is stopped, the earth auger 16D is quickly started and rotates in the reverse direction, so that the centrifugal force is applied on the soil trapped in the channels of the screw of the earth auger 16C and the soil is thrown off the channels.

When the piece of information DAS about the rake is selected and the icon 71 representing the rake is displayed on the instrument panel screen 22*a,* the hydraulic pressure gauge 80 is displayed such that the proper hydraulic pressure range 80*a* is defined by the minimum proper hydraulic pressure PL4 and the maximum proper hydraulic pressure PU4 included in the hydraulic pressure characteristics information Dp in the piece of information DA5.

In such a case, upon switching the AUX switch 18 from OFF to ON by the operator, the work attachment 16 (rake) is slowly started both in the normal flow mode and in the high flow mode, based on the startup operation information Dm1 in the piece of information DA5. On the contrary, upon switching the AUX switch 18 from ON to OFF, the work attachment 16 (rake) slowly stops both in the normal flow mode and in the high flow mode, based on the stop operation information Dm2 in the piece of information DA5.

Specifically, when the controller 20 has acquired the piece of information DA1 about the AUX default, upon switching the AUX switch 18 from OFF to ON, the work attachment 16 quickly starts both when the normal flow mode is selected and when the high flow mode is selected. However, when the controller 20 has acquired the piece of information DAS about the rake, upon switching the AUX switch 18 from OFF to ON, the work attachment 16 (rake) is slowly started both when the normal flow mode is selected and when the high flow mode is selected.

On the contrary, when the controller 20 has acquired the piece of information DA1 about the AUX default, upon switching the AUX switch 18 from ON to OFF, the work attachment 16 quickly stops when the normal flow mode is selected; however, when the controller 20 has acquired the piece of information DA5 about the rake, upon switching the AUX switch 18 from ON to OFF, the work attachment 16 (rake) slowly stops when the normal flow mode is selected. Such slow starting and slow stopping make it possible to eliminate or reduce the likelihood that the rake will leave unintended marks on the soil when started or stopped.

The values of the minimum proper hydraulic pressure PL and the maximum proper hydraulic pressure PU (parameters) in the hydraulic pressure characteristics information (hydraulic pressure gauge information) Dp in each piece of information DA stored in the controller 20 can be inputted and updated by the operator via the parameter settings screen 22*c,* as described earlier.

Similarly, the following may also be initially inputted and set by the operator via, for example, a screen of the display 22: the level of the speed of switching (speed of the spool) as the startup operation information Dm1 for the normal flow mode; the level of the speed of switching (speed of the spool) as the startup operation information Dm1 for the high flow mode; the level of the speed of switching (speed of spool) as the stop operation information Dm2 for the normal flow mode; the level of the speed of switching (speed of the spool) as the stop operation information Dm2 for the high flow mode; and the like, in the operation characteristics information (switching speed information) Dm. Such levels, after inputted and set, may be updated by the operator.

On the other hand, as illustrated in FIG. 3, each work attachment 16 (the earth auger 16C in FIG. 3) has an IC tag 16*b* which stores a piece of information DB equivalent to a piece of information DA stored in the memory 21. When the work attachment 16 is attached to the lift arms 10, the communication device 23 of the working machine 1 acquires a signal indicative of the information in the IC tag 16*b* via a wired or wireless communication, so that the controller 20 reads the piece of information DB.

FIG. 13 shows a piece of information DB1 stored in the IC tag 16*b* of the earth auger 16C, which is an example of the piece of information DB stored in the IC tag 16*b* of the work attachment 16. The piece of information DB includes: identification information Di including the type of the work attachment 16; and hydraulic pressure characteristics information (hydraulic pressure gauge information) Dp at least including AUX information Da similarly to the information DA stored in the memory 21. If the AUX information Da indicates that AUX actuator(s) is/are included, the hydraulic pressure characteristics information (hydraulic pressure gauge information) Dp includes the minimum proper hydraulic pressure PL and the maximum proper hydraulic pressure PU as information relating to the proper hydraulic pressure to make the hydraulic pressure gauge 80. The piece of information DB also includes operation characteristics information (switching speed information) Dm.

Note that the identification information Di may also include information relating to the specifications, optional equipment, and/or the like of the work attachment 16 in addition to the type of the work attachment 16 (that is, the identification information Di may include more detailed information than the identification information Di in the information DA stored in the memory 21) so that pieces of information DB stored in respective work attachments 16 differ from each other in terms of, for example, the specifications, optional equipment, and/or the like. Accordingly, the hydraulic pressure characteristics information Dp and the operation characteristics information Dm in each piece of information DB may also have values and/or the like more suitable for the work attachment 16 according to the specifications, equipment, and/or the like.

Upon acquisition by the controller 20 of the piece of information DB received at the communication device 23 as described above, the icon 71 of the work attachment 16 is displayed on the instrument panel screen 22*a*, similarly to the case where the operator selects the attachment icon 91 representing the work attachment 16 via the attachment selection screen 22*b*.

In the case where the work attachment 16 includes AUX actuator(s), the instrument panel screen 22*a* displays the hydraulic pressure gauge 80 having the proper hydraulic pressure range 80*a* defined based on the hydraulic pressure characteristics information (hydraulic pressure gauge information) Dp included in the piece of information DB.

On the basis of the operation characteristics information (switching speed information) Dm included in the piece of information DB, the following are set: the rate of increase in driving speed of the work attachment 16 when started upon switching of the AUX switch 18 from OFF to ON (for example, the operation level "quick start", "moderate start", or "slow start"); and the rate of decrease in driving speed of the work attachment 16 when stopped upon switching of the AUX switch 18 from ON to OFF (for example, the operation level "quick stop", "moderate stop", or "slow stop").

Thus, the controller 20 acquires the piece of information DB issued by the work attachment 16, and thereby causes the instrument panel screen 22*a* to display the hydraulic pressure gauge 80 corresponding to the work attachment 16 and controls the operation of the work attachment 16 at startup and the operation of the work attachment 16 at stopping according to the type and/or the like of the work attachment 16, without requiring the operator to perform the operation of selecting the attachment icon 91 via the attachment selection screen.

Note that a piece of information DB in the IC tag 16*b* in a work attachment 16 and a piece of information DA regarding the same work attachment 16 stored in the memory 21 may differ in content from each other. For example, the minimum proper hydraulic pressure PL and the maximum proper hydraulic pressure PU in the hydraulic pressure characteristics information (hydraulic pressure gauge information) Da may differ between the information DA and the information DB.

With regard to pieces of information DA stored in the memory 21 of the working machine 1, for example, for the memory 21 to store pieces of information DA prepared for respective models or specifications of work attachments 16 of the same type to address diversity in models and specifications, the memory 21 memory needs to have a large capacity, for example. One way to address such an issue would be to cause the memory 21 to store only a single piece of information DA for the work attachments 16 of the same type regardless of the models, specifications, and/or the like differing from each other.

On the contrary, the IC tag 16*b* of a work attachment 16 need only store information DB corresponding to that work attachment 16, and therefore it is easy to cause the IC tag 16*b* to store the information DB which varies depending on the specifications, equipment, and/or the like, as described earlier. In this respect, the information DB is apparently more suitable for the work attachment 16 actually attached to the lift arms 10 than the information DA.

Thus, for example, the controller 20 may be configured or programmed such that, even in the case where the controller 20 has already acquired a piece of information DA about a single work attachment 16 in response to the pressing of an attachment icon 91 by the operator, if the controller 20 acquires a piece of information DB from the work attachment 16 actually attached to the lift arms 10, the controller 20 gives priority to the information DB and causes the hydraulic pressure gauge 80 to be displayed based on the information DB.

Figure 14A:
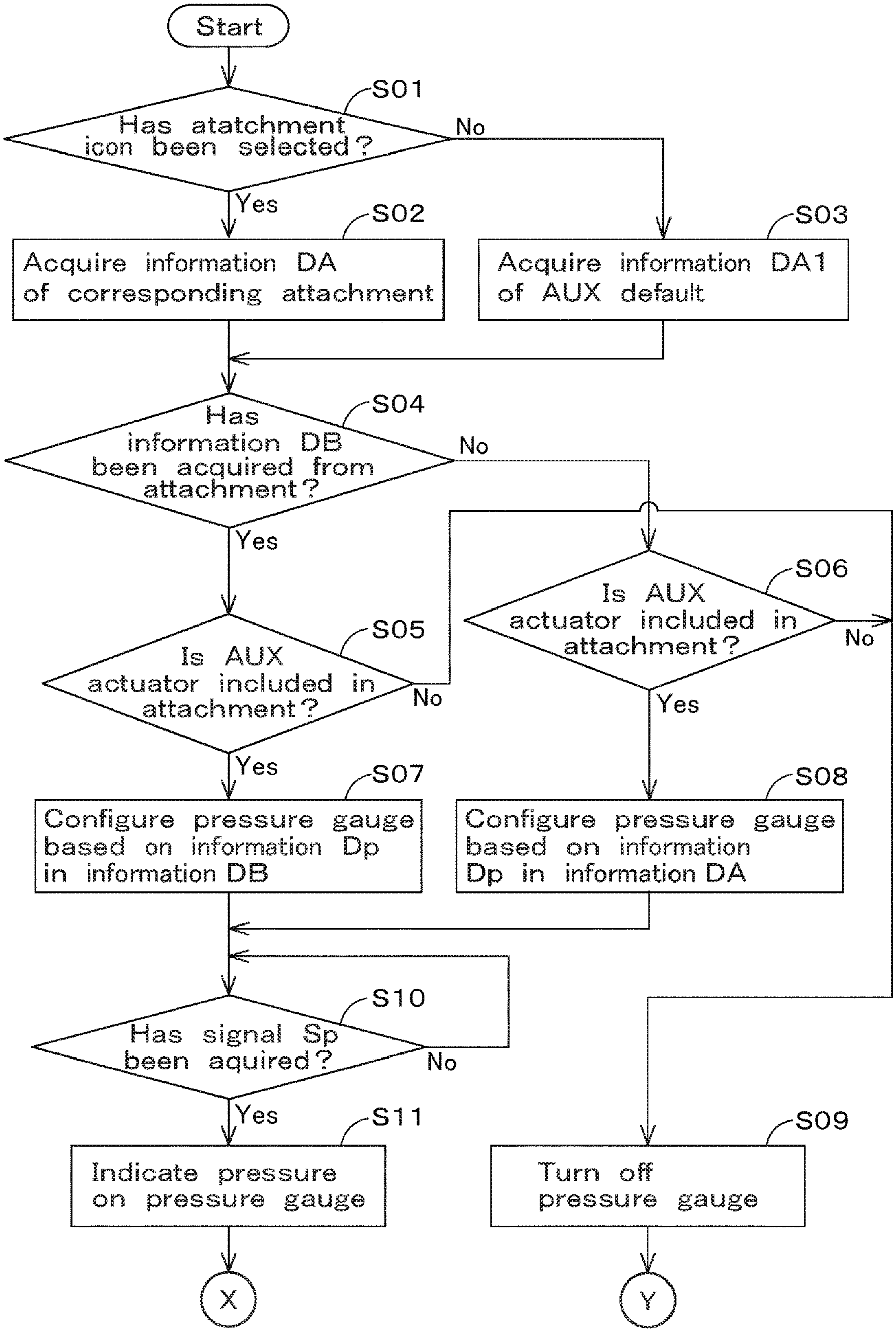
FIG. 14A is a flowchart in which a controller performs control based on pieces of information for respective work attachments.
Figure 14B:
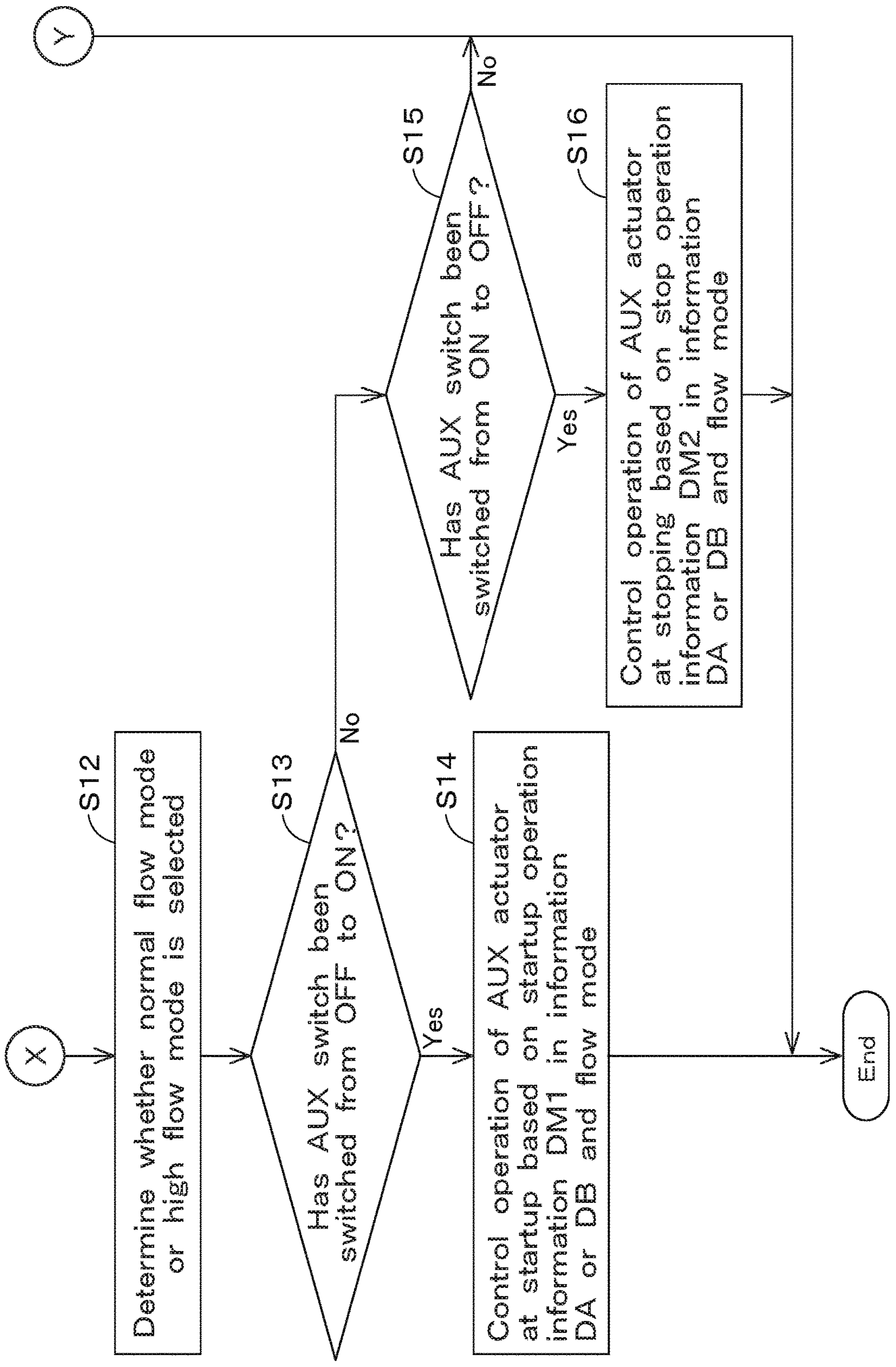
FIG. 14B is a flowchart continuing from the flowchart of FIG. 14A.

The flowchart shown in FIGS. 14A and 14B shows a flow of steps performed by the controller 20 to control a configuration of the hydraulic pressure gauge 80 and the operation of the AUX actuator at startup and the operation of the AUX actuator at stopping. Note that the points X in FIGS. 14A and 14B indicate the same point and the points Y in FIGS. 14A and 14B indicate the same point, i.e., FIGS. 14A and 14B show a single flowchart. The following description discusses a flow of the steps shown in FIGS. 14A and 14B.

Referring to FIG. 14A, the controller 20 tries to, depending on which attachment icon 91 is selected by an operator from the attachment list 90 appearing on the attachment selection screen 22*b* (step S01), acquire a corresponding piece of information DA from a group (list) of pieces of information DA stored in the memory 21. Specifically, if the operator selects an icon 91 indicating a specific work attachment 16 other than the AUX default icon 91*a* (YES in step S01), the controller 20 acquires the piece of information DA about that work attachment 16 from the memory 21 (step S02). On the contrary, if the operator selects the AUX default icon 91*a* or the operator does not select an icon 91 indicating a specific work attachment 16 other than the AUX default icon 91*a* (NO in step S01), the controller 20 acquires a piece of information DA1 about the AUX default (step S03).

It is noted here that, if the communication device 23 has acquired a signal representative of a piece of information DB issued by the work attachment 16, the controller 20 acquires the piece of information DB (YES in step S04), and uses the piece of information DB with higher priority than the piece of information DA. The controller 20 determines whether the work attachment 16 includes an AUX actuator based on AUX information Da in the piece of information DB (step S05). If the communication device 23 has not received the signal representative of the piece of information DB and the controller 20 has not acquired the piece of information DB from the attachment 16 (NO in step S04), the controller 20 determines whether the work attachment 16 includes an AUX actuator based on AUX information Da in the piece of information DA acquired from the memory 21 (step S06).

If the controller 20 determines that the work attachment 16 includes no AUX actuators based on the AUX information Da in the piece of information DA or DB (NO in step S05 or NO in step S06), the controller 20 does not cause the pressure gauge 80 to be displayed on the instrument panel screen 22*a* (turns off the pressure gauge 80) (step S09).

For example, in the case where a bucket 16A as a work attachment 16 is attached to the lift arms 10, when the controller 20 recognizes that the AUX information Da indicates that "no AUX actuators are included" in the piece of information DA2 acquired from the memory 21 upon selection of the bucket icon 91*b* from the attachment list 90 (see FIG. 12) (NO in step S4 and NO in step S06) or in the piece of information DB acquired from the IC tag 16*b* when the bucket 16A includes an IC tag 16*b* as illustrated in FIG. 3 (YES in step S04 and NO in step S05), the controller 20 causes the attachment icon 71 corresponding to the bucket icon 91*b* to be displayed on the instrument panel screen 22*a* but does not cause the pressure gauge 80 to be displayed on the instrument panel screen 22*a* (turns off the pressure gauge 80) (step S09).

Note that, in the case where the bucket 16A is attached to the lift arms 10, where the bucket icon 91*b* is not selected (NO in step S01), and where the piece of information DB from the bucket 16A is not acquired (NO in step S04), the controller 20 uses the piece of information DA1 about the AUX default having been acquired (see FIG. 12) (step S03). In such a case, the controller 20 causes the attachment icon 71 corresponding to the AUX default icon 91*a* to be displayed on the instrument panel screen 22*a,* but does not cause the pressure gauge 80 to be displayed on the instrument panel screen 22*a* (turns off the pressure gauge 80) provided that the AUX switch 18 is held in the OFF state (it is usually unlikely that the AUX switch 18 is turned ON when the bucket 16A including no hydraulic actuators is attached to the lift arms 10).

On the contrary, if the controller 20 has acquired the piece of information DB from the work attachment 16 (YES in step S04), upon determination that the work attachment 16 includes an AUX actuator based on the AUX information Da in the acquired piece of information DB (YES in step S05), the controller 20 configures the hydraulic pressure gauge 80 by, for example, defining the appropriate hydraulic pressure range 80*a* based on the hydraulic pressure characteristics information Dp (e.g., parameters indicative of the minimum proper hydraulic pressure PL and the maximum proper hydraulic pressure PU included in the hydraulic pressure characteristics information Dp) of the piece of information DB, and causes the hydraulic pressure gauge 80 to be displayed on the instrument panel screen 22*a* (turns on the hydraulic pressure gauge 80) (step S07).

If the controller 20 has not acquired the piece of information DB from the work attachment 16 (NO in step S04), upon determination that the work attachment 16 includes an AUX actuator based on the acquired piece of information DA (YES in step S06), the controller 20 configures the hydraulic pressure gauge 80 by, for example, defining the appropriate hydraulic pressure range 80*a* based on the hydraulic pressure characteristics information Dp (e.g., parameters indicative of the minimum proper hydraulic pressure PL and the maximum proper hydraulic pressure PU included in the hydraulic pressure characteristics information Dp) of the piece of information DA, and causes the hydraulic pressure gauge 80 to be displayed on the instrument panel screen 22*a* (turns on the hydraulic pressure gauge 80) (step S08).

After the hydraulic pressure gauge 80 is displayed on the instrument panel screen 22*a* based on the piece of information DA or DB in such a manner, the communication device 23 continues to receive a detected hydraulic pressure signal PS indicative of a current hydraulic pressure in the AUX actuator issued by the hydraulic pressure detector 16*a* of the work attachment 16, the controller 20 acquires the detected hydraulic pressure signal PS every time the communication device 23 receives the signal (step S10), and the controller 20 causes the indicator 81 indicative of the current hydraulic pressure CP calculated from the detected hydraulic pressure signal PS to be displayed on the hydraulic pressure gauge 80 (step S11).

For example, in the case where an earth auger 16C is attached to the lift arms 10, when the controller 20 recognizes that the AUX information Da indicates that "AUX actuator(s) is included" in the piece of information DA4 acquired from the memory 21 upon selection of the auger icon 91*c* from the attachment list 90 (see FIG. 12) (NO in step S04 and Yes in step S06) or in the piece of information DB1 acquired from the IC tag 16*b* of the earth auger 16C (see FIG. 13) (YES in step S04 and YES in step S05), the controller 20 causes the attachment icon 71 corresponding to the auger icon 91*c* to be displayed on the instrument panel screen 22*a* and causes the pressure gauge 80 having the appropriate hydraulic pressure range 80*a* configured corresponding to the earth auger 16C to be displayed on the instrument panel screen 22*a* (turns ON the pressure gauge 80).

In the case where the hydraulic pressure gauge 80 is configured based on the piece of information DB1 acquired from the earth auger 16C, when defining the appropriate hydraulic pressure range 80*a* corresponding to the earth auger 16C on the hydraulic pressure gauge 80, the controller 20 defines the appropriate hydraulic pressure range 80*a* using the minimum proper hydraulic pressure PL3*a* and the maximum proper hydraulic pressure PU3*a* (see FIG. 13) indicated by the parameters included in the hydraulic pressure characteristics information Dp in the piece of information DB1 (step S07). On the contrary, when configuring the hydraulic pressure gauge 80 based on the piece of information DA4 acquired from the memory 21, the controller 20 defines the appropriate hydraulic pressure range 80*a* using the minimum proper hydraulic pressure PL3 and the maximum proper hydraulic pressure PU3 (see FIG. 12) indicated by the parameters included in the hydraulic pressure characteristics information Dp in the piece of information DA4 (step S08).

The operator, in operating the AUX actuator of the work attachment 16, monitors the hydraulic pressure gauge 80 displayed on the instrument panel screen 22*a* to determine, for example, at which position on the hydraulic pressure gauge 80 the current hydraulic pressure CP is displayed (whether or not the current hydraulic pressure CP is displayed within the appropriate hydraulic pressure range 80*a*), and, based on the determination, turns ON or OFF the AUX switch 18 to change the driving speed of the AUX actuator and/or turn ON or OFF the driving of the AUX actuator.

Referring to FIG. 14B, the controller 20 receives a position signal inputted from the flow switch 19, and determines whether the normal flow mode or the high flow mode is selected (step S12). Next, when the operator turns ON or OFF the AUX switch 18, the controller 20 controls the operation of the AUX actuator of the work attachment 16 at startup or the operation of the AUX actuator of the work attachment 16 at stopping based on the selected flow mode and the operation characteristics information Dm in the acquired piece of information DA or DB.

Specifically, when the AUX switch 18 is switched ON from OFF (YES in step S13), the controller 20 controls the operation of the AUX actuator of the work attachment 16 at startup based on the selected one of the normal and high flow modes and the startup operation information Dm1 in the acquired piece of information DA or DB (step S14).

When the AUX switch 18 is switched OFF from ON (NO in step S13 and YES in step S15), the controller 20 controls the operation of the AUX actuator of the work attachment 16 at stopping based on the selected one of the normal and high flow modes and the stop operation information Dm2 in the acquired piece of information DA or DB (step S16).

For example, in the case where the earth auger 16C as a work attachment 16 is attached to the lift arms 10 and the controller 20 has, for example, configured the hydraulic pressure gauge 80 corresponding to the earth auger 16C based on the piece of information DA4 acquired from the memory 21 (see FIG. 12) or the piece of information DB1 acquired from the earth auger 16C (see FIG. 13), upon switching the AUX switch 18 from OFF to ON (YES in step S13), the controller 20 controls the proportional solenoid valve 55A or 55B so that the operation of the AUX actuator of the work attachment 16 at startup is "quick start" (causes the spool of the AUX control valve 53 to move quickly) based on the startup operation information Dm1 in the acquired piece of information DA4 or DB1, regardless of whether the normal flow mode is selected or the high flow mode is selected (step S14).

On the contrary, in the case where the earth auger 16C is attached to the lift arms 10 and the controller 20 has, for example, configured the hydraulic pressure gauge 80 corresponding to the earth auger 16C based on the piece of information DA4 acquired from the memory 21 (see FIG. 12) or the piece of information DB1 acquired from the earth auger 16C (see FIG. 13), upon switching the AUX switch 18 from ON to OFF (YES in step S15), the controller 20 controls the proportional solenoid valve 55A or 55B so that the operation of the AUX actuator of the work attachment 16 at stopping is "quick stop" based on the stop operation information Dm2 in the acquired piece of information DA4 or DB1, regardless of whether the normal flow mode is selected or the high flow mode is selected.

Note that, in the case where the earth auger 16C is attached to the lift arms 10 but the controller 20 has not acquired the piece of information DA4 or DB1 about the earth auger 16C, the controller 20 configures the hydraulic pressure gauge 80 corresponding to the AUX default based on the AUX default information DA1 acquired from the memory 21 (see FIG. 12) (step S03, step S08). The appropriate hydraulic pressure range 80*a* of the hydraulic pressure gauge 80 is defined by the minimum proper hydraulic pressure PL1 and the maximum proper hydraulic pressure PU1 indicated by the parameters included in the hydraulic pressure characteristics information Dp of the information DA1 (see FIG. 12).

Therefore, there may be cases in which, because of the difference between the appropriate hydraulic pressure range 80*a* on the hydraulic pressure gauge 80 corresponding to the AUX default and the appropriate hydraulic pressure range 80*a* on the hydraulic pressure gauge 80 corresponding to the earth auger 16C configured based on the information DB1 or DA4 (that is, because of the difference between the minimum proper hydraulic pressure PL1 and the minimum proper hydraulic pressure PL3 or PL3*a*, and/or the difference between the maximum proper hydraulic pressure PU1 and the maximum proper hydraulic pressure PU3 or PU3*a*), the operator cannot manage the hydraulic pressure of the earth auger 16C accurately.

There may be also cases in which, in the case where the earth auger 16C is attached to the lift arms 10 but the attachment icon 71 corresponding to the AUX default icon 91*a* is displayed on the instrument panel screen 22*a*, upon switching the AUX switch 18 from ON to OFF by the operator when the high flow mode is selected, the controller 20 controls the operation of the AUX actuator at stopping based on the stop operation information Dm2 in the information DA1 and therefore the AUX actuator "slowly stops", so that soil cannot be thrown off the earth auger 16C in an intended manner.

If the operator recognizes that there is a problem in control of the configuration of the hydraulic pressure gauge 80, the operation at startup, and/or the operation at stopping based on the AUX default information DA1 as described above, the operator may press the storage icon 78 with a finger to switch the instrument panel screen 22*a* to the attachment selection screen 22*b* and select the attachment icon 91 that represents the type of work attachment 16 actually attached to the lift arms 10 (or to be actually attached to the lift arms 10) (in this case, selects the attachment icon 91 representing the auger icon 91*c*) from the attachment icons 91 of the attachment list 90 (step S02). This makes it possible to cause the controller 20 to acquire a piece of information DA corresponding to the work attachment 16 (in this case, information DA4), thus changing the hydraulic pressure gauge 80 corresponding to the AUX default to the hydraulic pressure gauge 80 accurately corresponding to the work attachment 16 being used (in this case, the earth auger 16C) and changing the operation of the AUX actuator at startup and/or the operation of the AUX actuator at stopping resulting from ON/OFF of the AUX switch 18 to those suitable for the manner in which the work attachment 16 (in this case, the earth auger 16C) is used.

Note that the information DB acquired from the work attachment 16 may be information that only includes identification information Di (type, specifications, and/or optional equipment of the work attachment 16) (i.e., information DB which is about the work attachment 16 including an AUX actuator but does not include hydraulic pressure characteristics information Dp or operation characteristics information Dm). In such a case, the controller 20 may acquire the identification information Di included in the information DB to acquire the hydraulic pressure characteristics information Dp and/or the operation characteristics information Dm in the information DA of the work attachment 16 identified by the identification information Di, and the controller 20 may configure the hydraulic pressure gauge 80 based on the acquired hydraulic pressure characteristics information Dp and/or control the operation of the work attachment 16 at startup and/or the operation of the work attachment 16 at stopping based on the acquired operation characteristics information Dm.

Specifically, even in cases where the operator has not selected any attachment icons from the attachment list 90 on the attachment selection screen 22*b* or the operator has accidentally selected a wrong attachment icon 91 (attachment icon 91 that represents a different work attachment 16 from the work attachment 16 attached to or to be attached to the lift arms 10), the controller 20 acquires the piece of information DA of the work attachment 16 identified by the identification information Di in the information DB from the pieces of information DA stored in the memory 21, provided that the communication device 23 has received the information DB including the identification information Di from the work attachment 16 attached to or to be attached to the lift arms 10. This prevents or reduces problems that would otherwise occur because no information DA is selected from the memory 21 or wrong information DA is selected from the memory 21. Furthermore, even in the case of a work attachment 16 including an AUX actuator, the information DB stored in the IC tag 16*b* thereof need only include identification information Di. This reduces the amount of information stored in the IC tag 16*b*, making it possible to reduce cost and time for creation of IC tags 16*b* for respective work attachments 16.

In a first aspect, a working machine 1 includes: lift arms 10 as an attachment mount portion including AUX port(s) 11 as a hydraulic fluid port; an AUX hydraulic circuit 49 as a work-attachment-drive hydraulic circuit to supply hydraulic fluid to a work attachment 16 attached to the lift arms 10 and fluidly connected to the AUX port(s) 11; an AUX control valve 53 as a work-attachment-drive control valve to control a flow rate of hydraulic fluid supplied via the AUX hydraulic circuit 49 to the work attachment 16; a memory 21; and a controller 20. The AUX control valve 53 is operable to change a degree of opening of one or more ports thereof that are in communication with the AUX hydraulic circuit 49 by movement of a spool thereof; and change a speed of switching of the AUX control valve 53, the speed of switching being a speed of movement of the spool. The memory 21 stores pieces of operation characteristics information Dm corresponding to respective work attachments 16 each for use as the work attachment 16 attached to the lift arms 10 and fluidly connected to the AUX port(s) 11. The pieces of operation characteristics information Dm each include information relating to the speed of switching of the AUX control valve 53 (startup operation information Dm1, stop operation information Dm2). The controller 20 is configured or programmed to select one of the pieces of operation characteristics information Dm corresponding to the respective work attachments 16 stored in the memory 21 that corresponds to the work attachment 16 attached to the lift arms 10 and fluidly connected to the AUX port(s) 11, and control, based on the selected one of the pieces of operation characteristics information Dm, the speed of switching of the AUX control valve 53 when starting the work attachment 16 and/or when stopping the work attachment 16.

With this, the operator can cause the work attachment 16 to operate in a manner suitable therefor when started and/or when stopped, merely by causing the controller 20 to acquire operation characteristics information Dm corresponding to the work attachment 16 attached to the attachment mount portion (lift arms 10). This improves work efficiency.

The information relating to the speed of switching of the AUX control valve 53 may include stop operation information Dm2 which is information relating to selection of whether to cause the work attachment 16 fluidly connected to the AUX port(s) 11 to operate quickly or slowly when stopped.

With this, the controller 20 is capable of causing the work attachment 16 to operate in a manner suitable therefor when stopped, improving work efficiency.

The information relating to the speed of switching of the AUX control valve 53 may include startup operation information Dm1 which is information relating to selection of whether to cause the work attachment 16 fluidly connected to the AUX port(s) 11 to operate quickly or slowly when started.

With this, the controller 20 is capable of causing the work attachment 16 to operate in a manner suitable therefor when started, improving work efficiency.

The controller 20 may be configured or programmed to switch a mode (flow mode) relating to a flow rate of hydraulic fluid flowing from the AUX control valve 53 to the AUX port(s) 11 via the AUX hydraulic circuit 49 between (i) a normal flow mode (normal flow rate mode) in which the flow rate is a normal flow rate and (ii) a high flow mode (increased flow rate mode) in which the flow rate is an increased flow rate higher than the normal flow rate. The controller 20 may be configured or programmed to control, based on the information relating to the speed of switching of the AUX control valve 53 (startup operation information Dm1, stop operation information Dm2) included in the selected one of the pieces of operation characteristics information Dm, the speed of switching of the AUX control valve 53 when starting the work attachment 16 and/or when stopping the work attachment 16, regardless of whether the mode relating to the flow rate is the normal flow mode or the high flow mode.

This achieves the following. That is, the manner in which the work attachment 16 operates when started and/or when stopped (the speed of switching) is not determined uniformly by the setting of the flow mode to the normal flow mode or the high flow mode, but by the information (startup operation information Dm1, stop operation information Dm2) included in the operation characteristics information Dm acquired by the controller 20 and corresponding to the work attachment 16. This makes it possible to cause the work attachment 16 to operate in a manner suitable therefor when started and/or when stopped, improving work efficiency.

The working machine 1 may further include a display 22 to display an attachment list 90 which is a list of the work attachments 16 to allow an operator to select one of the work attachments 16 from the attachment list 90. The controller 20 may be configured or programmed to, upon selection of one of the work attachments 16 from the attachment list 90 displayed on the display 22, control the speed of switching of the AUX control valve 53 when starting the work attachment 16 and/or when stopping the work attachment 16 based on one of the pieces of operation characteristics information Dm that corresponds to the selected one of the work attachments 16.

With this, the operator can cause the controller 20 to acquire operation characteristics information Dm corresponding to the work attachment 16 attached to the attachment mount portion (lift arm(s) 10) merely by selecting the work attachment 16 from the attachment list 90 displayed by the display 22. That is, the operator can cause the work attachment 16 to operate in a manner suitable therefor when started and/or when stopped, merely by performing such a simple operation. This improves work efficiency.

The working machine 1 may further include an AUX switch 18 which is an attachment operating member to be operated by an operator to start or stop the work attachment 16 attached to the lift arms 10. The controller 20 may be configured or programmed to, based on the selected one of the pieces of operation characteristics information Dm, control the speed of switching of the AUX control valve 53 when the AUX switch 18 is operated.

With this, even though the AUX switch 18 does not have the function of adjusting the speed of switching of the AUX control valve 53 which is the work-attachment-drive control valve, the controller 20 can automatically cause the work attachment 16 to operate in a manner suitable therefor when started and/or when stopped, provided that the controller 20 has acquired the operation characteristics information Dm corresponding to the work attachment 16. This improves work efficiency.

The working machine 1 may further include: a communication device 23 as an information acquirer to, when the work attachment 16 attached to the lift arms 10 issues information DB, acquire the information DB. The controller 20 may be configured or programmed to: when the communication device 23 acquires the information DB issued by the work attachment 16 and the information DB thus acquired includes identification information Di identifying the work attachment 16 attached to the lift arms 10, select one of the pieces of operation characteristics information Dm that corresponds to the work attachment 16 identified by the identification information Di included in the information DB acquired by the communication device 23; and based on the selected one of the pieces of operation characteristics information Dm, control the speed of switching of the AUX control valve 53 when starting the work attachment 16 and/or when stopping the work attachment 16.

With this, without requiring the operator to perform the operation of causing the controller 20 to select and acquire the piece of information DA about the work attachment 16 from the pieces of information DA stored in the memory 21 of the working machine 1 in consideration of the work attachment 16 attached to the lift arm(s) 10 (or the work attachment 16 which is about to be attached to the lift arm(s) 10), the controller 20 can automatically cause the work attachment 16 to operate in a manner suitable therefor when started and/or when stopped, provided that the controller 20 acquires the piece of information DB issued by the work attachment 16. This improves work efficiency.

The identification information Di identifying the work attachment 16 may include information about a type, a specification, and/or optional equipment of the work attachment 16.

With this, the controller 20 is capable of acquiring more accurate operation characteristics information Dm corresponding not only to the type of the work attachment 16 but also to the specifications and/or optional equipment of the work attachment 16. This makes is possible to cause the work attachment 16 to operate in a manner suitable also for the specifications and equipment of the work attachment 16 when started and/or when stopped, and thus improves work efficiency.

The working machine 1 may further include: a communication device 23 as an information acquirer to, when the work attachment 16 attached to the lift arms 10 issues information DB, acquire the information DB. The controller 20 may be configured or programmed to, when the communication device 23 acquires the information DB issued by the work attachment 16 and the information DB thus acquired includes another piece of operation characteristics information Dm that corresponds to the work attachment 16 attached to the lift arms 10 and that includes information Dm1, Dm2 relating to the speed of switching of the AUX control valve 53 other than the pieces of operation characteristics information Dm stored in the memory 21, control, based on the another piece of operation characteristics information Dm included in the information DB acquired by the communication device 23, the speed of switching of the AUX control valve 53 when starting the work attachment 16 and/or when stopping the work attachment 16.

With this, the operation characteristics information Dm in the information DB about the work attachment 16 corresponding appropriately to that work attachment 16 is automatically selected, making it possible to cause the work attachment 16 to operate in a manner more suitable therefor when started and/or when stopped. This improves work efficiency.

The controller 20 may be configured or programmed to control the speed of switching of the AUX control valve 53 when starting the work attachment 16 and/or when stopping the work attachment 16 based on the another piece of operation characteristics information Dm included in the information DB acquired by the communication device 23 with higher priority than the pieces of operation characteristics information Dm stored in the memory 21.

With this, the operation characteristics information Dm in the information DB about the work attachment 16 more appropriately corresponding to that work attachment 16 than the operation characteristics information Dm in the information DA stored in the memory 21 is automatically selected, making it possible to cause the work attachment 16 to operate in a manner more suitable therefor when started and/or when stopped. This improves work efficiency.

In a second aspect, a working machine 1 includes: lift arms 10 as an attachment mount portion including AUX port(s) 11 as a hydraulic fluid port; an AUX hydraulic circuit (work-attachment-drive hydraulic circuit) 49 to supply hydraulic fluid to a work attachment 16 attached to the lift arms 10 and fluidly connected to the AUX port(s) 11; a memory 21 to store pieces of hydraulic pressure characteristics information Dp corresponding to respective work attachments 16 each for use as the work attachment 16 attached to the lift arms 10 and fluidly connected to the AUX port(s) 11, the pieces of hydraulic pressure characteristics information Dp each including at least one parameter indicating proper pressure (minimum proper hydraulic pressure PL, maximum proper hydraulic pressure PU) corresponding to a corresponding one of the work attachments 16; and a display 22 to display a hydraulic pressure gauge 80 including an indication of the proper pressure (minimum proper hydraulic pressure PL, maximum proper hydraulic pressure PU, proper hydraulic pressure range 80*a*) corresponding to the corresponding one of the work attachments 16.

With this, the display 22 displays the hydraulic pressure gauge 80 including the indication of the proper hydraulic pressure (minimum proper hydraulic pressure PL, maximum proper hydraulic pressure PU, proper hydraulic pressure range 80*a*) set according to what work attachment 16 is used. The operator, by checking the current hydraulic pressure CP in the work attachment 16 displayed on the hydraulic pressure gauge 80 against the indication of the proper hydraulic pressure at the working machine 1, can know the current hydraulic pressure status of the work attachment 16 accurately and operate the work attachment 16 appropriately in consideration of the current hydraulic pressure status.

The working machine 1 may further include: a controller 20 to select one of the pieces of hydraulic pressure characteristics information Dp corresponding to the respective work attachments 16 stored in the memory 21 that corresponds to the work attachment 16 attached to the lift arms 10 and fluidly connected to the AUX port(s) 11; and cause the display 22 to display the hydraulic pressure gauge 80 including the indication of the proper pressure (minimum proper hydraulic pressure PL, maximum proper hydraulic pressure PU) corresponding to the work attachment 16 based on the selected one of the pieces of hydraulic pressure characteristics information Dp. The pieces of hydraulic pressure characteristics information Dp corresponding to the respective work attachments 16 may each include, as the at least one parameter, one or more parameters indicating a minimum proper hydraulic pressure PL and/or a maximum proper hydraulic pressure PU included in a proper hydraulic pressure range 80*a* corresponding to a corresponding one of the work attachments 16. The controller 20 may be configured or programmed to cause the proper hydraulic pressure range 80*a* corresponding to the work attachment 16 to be displayed on the hydraulic pressure gauge 80, the proper hydraulic pressure range 80*a* being defined based on the one or more parameters included in the selected one of the pieces of hydraulic pressure characteristics information Dp.

With this, the following is achieved. That is, the memory 21 stores pieces of hydraulic pressure characteristics information Dp corresponding to respective work attachments 16. The controller 20 causes the display 22 to display the hydraulic pressure gauge 80 having the proper hydraulic pressure range 80*a* set based on a piece of hydraulic pressure characteristics information Dp corresponding to the currently used work attachment 16 or the work attachment 16 to be used. Therefore, the operator can accurately and easily determine whether the hydraulic pressure status of the work attachment 16 is appropriate or not by determining whether or not the current hydraulic pressure CP of the work attachment 16 displayed on the hydraulic pressure gauge 80 is within the proper hydraulic pressure range 80*a*. This makes it possible for the operator to appropriately operate the work attachment 16 in consideration of the current hydraulic pressure status.

The pieces of hydraulic pressure characteristics information Dp may each include, as the at least one parameter, a parameter indicating the minimum proper hydraulic pressure PL corresponding to the corresponding one of the work attachments 16. The controller 20 may be configured or programmed to cause the proper hydraulic pressure range 80*a* defined based on the parameter to be displayed on the hydraulic pressure gauge 80 and cause a below-proper-hydraulic-pressure range 80*b* below the minimum proper hydraulic pressure PL to be displayed on the hydraulic pressure gauge 80.

With this, the operator can know whether the work attachment 16 has an appropriate hydraulic pressure or has an insufficient hydraulic pressure by checking whether the current hydraulic pressure CP of the work attachment 16 displayed on the hydraulic pressure gauge 80 is within the proper hydraulic pressure range 80*a* or within the below-proper-hydraulic-pressure range 80*b*. This allows the operator to appropriately operate the work attachment 16 such that the insufficiency of hydraulic pressure is avoided.

The pieces of hydraulic pressure characteristics information Dp may each include, as the at least one parameter, a parameter indicating the maximum proper hydraulic pressure PU corresponding to the corresponding one of the work attachments 16. The controller 20 may be configured or programmed to cause the proper hydraulic pressure range 80*a* defined based on the parameter to be displayed on the hydraulic pressure gauge 80 and cause an above-proper-hydraulic-pressure range 80*c* above the maximum proper hydraulic pressure PU to be displayed on the hydraulic pressure gauge 80.

With this, the operator can know whether the work attachment 16 has an appropriate hydraulic pressure or has an excessive hydraulic pressure by checking whether the current hydraulic pressure CP of the work attachment 16 displayed on the hydraulic pressure gauge 80 is within the proper hydraulic pressure range 80*a* or within the above-proper-hydraulic-pressure range 80*c*. This allows the operator to appropriately operate the work attachment 16 such that the excess of hydraulic pressure is avoided.

The pieces of hydraulic pressure characteristics information Dp may each include, as the at least one parameter, parameters indicating the minimum proper hydraulic pressure PL and the maximum proper hydraulic pressure P1*b* corresponding to the corresponding one of the work attachments 16. The controller 20 may be configured or programmed to cause the proper hydraulic pressure range 80*a* defined based on the parameters to be displayed on the hydraulic pressure gauge 80, cause a below-proper-hydraulic-pressure range 80*b* below the minimum proper hydraulic pressure PL to be displayed on the hydraulic pressure gauge 80, and cause an above-proper-hydraulic-pressure range 80*c* above the maximum proper hydraulic pressure PU to be displayed on the hydraulic pressure gauge 80.

With this, the operator can know whether the work attachment 16 has an appropriate hydraulic pressure or has an insufficient or excessive hydraulic pressure by checking whether the current hydraulic pressure CP of the work attachment 16 displayed on the hydraulic pressure gauge 80 is within the proper hydraulic pressure range 80*a*, within the below-proper-hydraulic-pressure range 80*b*, or within the above-proper-hydraulic-pressure range 80*c*. This allows the operator to appropriately operate the work attachment 16 such that the insufficiency or excess of hydraulic pressure is avoided.

The working machine 1 may further include a controller 20 to select one of the pieces of hydraulic pressure characteristics information Dp corresponding to the respective work attachments 16 stored in the memory 21 that corresponds to the work attachment 16 attached to the lift arms 10 and fluidly connected to the AUX port(s) 11, and cause the display 22 to display the hydraulic pressure gauge 80 including the indication of the proper pressure (proper hydraulic pressure range 80*a*) corresponding to the work attachment 16 based on the selected one of the pieces of hydraulic pressure characteristics information Dp. The pieces of hydraulic pressure characteristics information Dp may each include AUX information Da relating to selection of whether or not to display the hydraulic pressure gauge 80. The controller 20 may be configured or programmed to, if the selected one of the pieces of hydraulic pressure characteristics information Dp includes AUX information Da indicating not to display the hydraulic pressure gauge 80, not cause the display 22 to display the hydraulic pressure gauge 80.

With this, when the operator causes the controller 20 to select and acquire the piece of hydraulic pressure characteristics information Dp that corresponds to the currently used work attachment 16 or the work attachment 16 to be used, whether to display the hydraulic pressure gauge 80 or not is determined automatically depending on whether the hydraulic pressure gauge 80 is necessary for the work attachment 16 or not. Therefore, the hydraulic pressure gauge 80 is not displayed when unnecessary, avoiding cluttered-looking instrument panel screen 22*a* and achieving a simple instrument panel screen 22*a*.

The working machine 1 may further include a controller 20 to select one of the pieces of hydraulic pressure characteristics information Dp corresponding to the respective work attachments 16 stored in the memory 21 that corresponds to the work attachment 16 attached to the lift arms 10 and fluidly connected to the AUX port(s) 11, and cause the display 22 to display the hydraulic pressure gauge 80 including the indication of the proper hydraulic pressure (proper hydraulic pressure range 80*a*) corresponding to the work attachment 16 based on the selected one of the pieces of hydraulic pressure characteristics information Dp. The display 22 may be operable to display a list 90 of the work attachments 16 to allow an operator to select one of the work attachments 16 from the list 90. The controller 20 may be configured or programmed to, upon selection of one of the work attachments 16 from the list 90 displayed on the display 22, cause the display 22 to display the hydraulic pressure gauge 80 including the indication of the proper hydraulic pressure corresponding to the selected one of the work attachments 16 based on one of the pieces of hydraulic pressure characteristics information Dp that corresponds to the selected one of the work attachments 16.

With this, the operator can, merely by performing the operation of selecting the work attachment 16 from the list 90 displayed on the display 22, cause the hydraulic pressure gauge 80 to be displayed based on the hydraulic pressure characteristics information Dp corresponding to the selected work attachment 16. The operator can operate the work attachment 16 in the most suitable manner while considering whether the current hydraulic pressure status of the work attachment 16 is suitable for the work attachment 16 using the thus-displayed hydraulic pressure gauge 80. This improves the reliability of work.

The working machine 1 may further include a communication device 23 as an information acquirer to, when the work attachment 16 attached to the lift arms 10 issues information DB, acquire the information DB. The controller 20 may be configured or programmed to: when the communication device 23 acquires the information DB issued by the work attachment 16 and the information DB thus acquired includes identification information Di identifying the work attachment 16 attached to the lift arms 10, select one of the pieces of hydraulic pressure characteristics information Dp that corresponds to the work attachment 16 identified by the identification information Di included in the information DB acquired by the communication device 23; and cause the display 22 to display the hydraulic pressure gauge 80 based on the selected one of the pieces of hydraulic pressure characteristics information Dp.

With this, upon receipt of the information DB from the work attachment 16 by the communication device 23 which is the information acquirer, the hydraulic pressure gauge 80 corresponding to the work attachment 16 is automatically displayed, without requiring the operator to perform the foregoing selecting operation. The operator can operate the work attachment 16 in the most suitable manner while considering whether the current hydraulic pressure status of the work attachment 16 is suitable for the work attachment 16 using the thus-displayed hydraulic pressure gauge 80. This improves the reliability of work.

The identification information Di identifying the work attachment 16 may include information about a type, a specification, and/or optional equipment of the work attachment 16.

With this, the controller 20 is capable of acquiring more accurate hydraulic pressure characteristics information Dp corresponding not only to the type of the work attachment 16 but also to the specifications and/or optional equipment of the work attachment 16. This makes is possible to achieve a hydraulic pressure gauge 80 suitable also for the specifications and equipment of the work attachment 16, and thus improves the reliability of work.

The working machine 1 may further include a communication device 23 as an information acquirer to, when the work attachment 16 attached to the lift arms 10 issues information DB, acquire the information DB. The controller 20 may be configured or programmed to, when the communication device 23 acquires the information DB issued by the work attachment 16 and the information DB thus acquired includes another piece of hydraulic pressure characteristics information Dp that corresponds to the work attachment 16 attached to the lift arms 10 and that includes at least one parameter indicating proper hydraulic pressure (minimum proper hydraulic pressure PL, maximum proper hydraulic pressure PU) corresponding to the work attachment 16 other than the pieces of hydraulic pressure characteristics information Dp stored in the memory 21, cause, based on the another piece of hydraulic pressure characteristics information Dp included in the information DB acquired by the communication device 23, the display 22 to display the hydraulic pressure gauge 80 including the indication of the proper hydraulic pressure (proper hydraulic pressure range 80*a*) corresponding to the work attachment 16.

With this, the hydraulic pressure characteristics information Dp in the information DB about the work attachment 16 corresponding appropriately to that work attachment 16 is automatically selected, making it possible to achieve a hydraulic pressure gauge 80 more suitable for the work attachment 16. This improves the reliability of work.

The controller 20 may be configured or programmed to cause the display 22 to display the hydraulic pressure gauge 80 including the indication of the proper hydraulic pressure (proper hydraulic pressure range 80*a*) corresponding to the work attachment 16 based on the another piece of hydraulic pressure characteristics information Dp included in the information DB acquired by the communication device 23 with higher priority than the pieces of hydraulic pressure characteristics information Dp stored in the memory 21.

With this, the hydraulic pressure characteristics information Dp in the information DB about the work attachment 16, more appropriately corresponding to that work attachment 16 than the hydraulic pressure characteristics information Dp in the information DA stored in the memory 21, is automatically selected, making it possible to achieve a hydraulic pressure gauge 80 more suitable for the work attachment 16. This improves the reliability of work.

The another piece of hydraulic pressure characteristics information Dp included in the information DB acquired by the communication device 23 as an information acquirer includes, as the at least one parameter, one or more parameters indicating a minimum proper hydraulic pressure PL and/or a maximum proper hydraulic pressure PU included in a proper hydraulic pressure range 80*a* corresponding to the work attachment 16. The controller 20 may be configured or programmed to cause the proper hydraulic pressure range 80*a* corresponding to the work attachment 16 to be displayed on the hydraulic pressure gauge 80, the proper hydraulic pressure range 80*a* being defined based on the one or more parameters included in the another piece of hydraulic pressure characteristics information Dp.

With this, the following is achieved. That is, the controller 20 causes the display 22 to display the hydraulic pressure gauge 80 having the proper hydraulic pressure range 80*a* set based on a piece of hydraulic pressure characteristics information Dp corresponding to the currently used work attachment 16 or the work attachment 16 to be used, based on the information DB received at the communication device 23. Therefore, the operator can accurately and easily determine whether the hydraulic pressure status of the work attachment 16 is appropriate or not by determining whether or not the current hydraulic pressure CP of the work attachment 16 displayed on the hydraulic pressure gauge 80 is within the proper hydraulic pressure range 80*a*. This makes it possible for the operator to appropriately operate the work attachment 16 in consideration of the current hydraulic pressure status.

The another piece of hydraulic pressure characteristics information Dp included in the information DB acquired by the communication device 23 may include, as the at least one parameter, a parameter indicating the minimum proper hydraulic pressure PL corresponding to the work attachment 16. The controller 20 may be configured or programmed to cause the proper hydraulic pressure range 80*a* defined based on the parameter to be displayed on the hydraulic pressure gauge 80 and cause a below-proper-hydraulic-pressure range 80*b* below the minimum proper hydraulic pressure PL to be displayed on the hydraulic pressure gauge 80.

With this, the operator can know whether the work attachment 16 has an appropriate hydraulic pressure or has an insufficient hydraulic pressure by checking whether the current hydraulic pressure CP of the work attachment 16 displayed on the hydraulic pressure gauge 80 is within the proper hydraulic pressure range 80*a* or within the below-proper-hydraulic-pressure range 80*b*. This allows the operator to appropriately operate the work attachment 16 such that the insufficiency of hydraulic pressure is avoided.

The another piece of hydraulic pressure characteristics information Dp included in the information acquired by the communication device 23 may include, as the at least one parameter, a parameter indicating the maximum proper hydraulic pressure PU corresponding to the work attachment 16. The controller 20 may be configured or programmed to cause the proper hydraulic pressure range 80*a* defined based on the parameter to be displayed on the hydraulic pressure gauge 80 and cause an above-proper-hydraulic-pressure range 80*c* above the maximum proper hydraulic pressure PU to be displayed on the hydraulic pressure gauge 80.

With this, the operator can know whether the work attachment 16 has an appropriate hydraulic pressure or has an excessive hydraulic pressure by checking whether the current hydraulic pressure CP of the work attachment 16 displayed on the hydraulic pressure gauge 80 is within the proper hydraulic pressure range 80*a* or within the above-proper-hydraulic-pressure range 80*c*. This allows the operator to appropriately operate the work attachment 16 such that the excess of hydraulic pressure is avoided.

The another piece of hydraulic pressure characteristics information Dp included in the information acquired by the communication device 23 may include, as the at least one parameter, parameters indicating the minimum proper hydraulic pressure PL and the maximum proper hydraulic pressure PU corresponding to the work attachment 16. The controller 20 may be configured or programmed to cause the proper hydraulic pressure range 80*a* defined based on the parameters to be displayed on the hydraulic pressure gauge 80, cause a below-proper-hydraulic-pressure range 80*b* below the minimum proper hydraulic pressure PL to be displayed on the hydraulic pressure gauge 80, and cause an above-proper-hydraulic-pressure range 80*c* above the maximum proper hydraulic pressure PU to be displayed on the hydraulic pressure gauge 80.

With this, the operator can know whether the work attachment 16 has an appropriate hydraulic pressure or has an insufficient or excessive hydraulic pressure by checking whether the current hydraulic pressure CP of the work attachment 16 displayed on the hydraulic pressure gauge 80 is within the proper hydraulic pressure range 80*a*, within the below-proper-hydraulic-pressure range 80*b*, or within the above-proper-hydraulic-pressure range 80*c*. This allows the operator to appropriately operate the work attachment 16 such that the insufficiency or excess of hydraulic pressure is avoided.

Content of the pieces of hydraulic pressure characteristics information Dp stored in the memory 21 may be changeable by an operator.

With this, the following is achieved. For example, if the operator determines that the hydraulic pressure gauge 80 based on the hydraulic pressure characteristics information Dp stored in the memory 21 does not correspond to the current state of the work attachment 16 because of, for example, variations in the specifications and optional equipment of the work attachment 16 or changes in durability of the work attachment 16 resulting from long-term use, the operator can change the content of the hydraulic pressure characteristics information Dp to update the hydraulic pressure gauge 80 such that the hydraulic pressure gauge 80 corresponds to the work attachment 16.

The working machine 1 may further include an operator's seat 7. The display 22 may be positioned such that the display 22 is visually recognizable to an operator seated on the operator's seat 7 regardless of actions of the work attachment 16 attached to the lift arms 10.

This eliminates or reduces the likelihood that the operator seated on the operator's seat 7 of the working machine 1 will not be able to see well the hydraulic pressure gauge located outside the working machine 1 (such as outside the cabin 3) because the hydraulic pressure gauge is covered with dust or is located at a position that is difficult to see from the operator seated on the operator's seat 7 and that work efficiency and reliability will decrease, which would otherwise occur if the hydraulic pressure gauge is provided on the work attachment 16. With this, the operator can reliably see the numeric values indicated on the hydraulic pressure gauge to reliably know the hydraulic pressure status of the work attachment 16. This improves work efficiency and the reliability of work.

The working machine 1 may further include a hydraulic pressure detector 16*a* to detect a hydraulic pressure in the AUX hydraulic circuit 49. The display 22 may be operable to display, on the hydraulic pressure gauge 80, a current hydraulic pressure CP detected by the hydraulic pressure detector 16*a*.

With this, the operator can accurately know the hydraulic pressure status in the AUX hydraulic circuit 49 by looking at the current hydraulic pressure CP appearing on the hydraulic pressure gauge 80, and can perform appropriate actions.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A working machine comprising:

an attachment mount portion including a hydraulic fluid port;

a work-attachment-drive hydraulic circuit to supply hydraulic fluid to a work attachment attached to the attachment mount portion and fluidly connected to the hydraulic fluid port, the work attachment including a hydraulic motor capable of rotating around a rotation axis;

a work-attachment-drive control valve to:

control a flow rate of hydraulic fluid supplied via the work-attachment-drive hydraulic circuit to the work attachment;

change a degree of opening of one or more ports thereof that are in communication with the work-attachment-drive hydraulic circuit by movement of a spool thereof; and change a speed of switching of the work-attachment-drive control valve, the speed of switching being a speed of movement of the spool;

a memory to store pieces of operation characteristics information corresponding to respective work attachments each for use as the work attachment attached to the attachment mount portion and fluidly connected to the hydraulic fluid port, the pieces of operation characteristics information each including information relating to the speed of switching of the work-attachment-drive control valve; and a controller to select one of the pieces of operation characteristics information corresponding to the respective work attachments stored in the memory that corresponds to the work attachment attached to the attachment mount portion and fluidly connected to the hydraulic fluid port; and control, based on the selected one of the pieces of operation characteristics information, the speed of switching of the work-attachment-drive control valve when starting the work attachment and/or when stopping the work attachment, wherein the information relating to the speed of switching of the work-attachment-drive control valve includes information relating to selection of whether to cause the work attachment fluidly connected to the hydraulic fluid port to operate at a first speed or a second speed slower than the first speed; and the controller is configured or programmed to control, in a case where a centrifugal force around the rotation axis of the hydraulic motor is required when the hydraulic motor of the work attachment stops, control the work-attachment-drive control valve to operate at the first speed when stopping the work attachment.

2. The working machine according to claim 1, wherein:

the controller is configured or programmed to switch a mode relating to a flow rate of hydraulic fluid flowing from the work-attachment-drive control valve to the hydraulic fluid port via the work-attachment-drive hydraulic circuit between (i) a normal flow rate mode in which the flow rate is a normal flow rate and (ii) an increased flow rate mode in which the flow rate is an increased flow rate higher than the normal flow rate; and the controller is configured or programmed to control, based on the information relating to the speed of switching of the work-attachment-drive control valve included in the selected one of the pieces of operation characteristics information, the speed of switching of the work-attachment-drive control valve when starting the work attachment and/or when stopping the work attachment, regardless of whether the mode relating to the flow rate is the normal flow rate mode or the increased flow rate mode.

3. The working machine according to claim 1, further comprising:

a display to display a list of the work attachments to allow an operator to select one of the work attachments from the list; wherein the controller is configured or programmed to, upon selection of one of the work attachments from the list displayed on the display, control the speed of switching of the work-attachment-drive control valve when starting the work attachment and/or when stopping the work attachment based on one of the pieces of operation characteristics information that corresponds to the selected one of the work attachments.

4. The working machine according to claim 1, further comprising:

an attachment operating member to be operated by an operator to start or stop the work attachment attached to the attachment mount portion, wherein the controller is configured or programmed to, based on the selected one of the pieces of operation characteristics information, control the speed of switching of the work-attachment-drive control valve when the attachment operating member is operated.

5. The working machine according to claim 1, further comprising:

an information acquirer to, when the work attachment attached to the attachment mount portion issues information, acquire the information, wherein the controller is configured or programmed to:

when the information acquirer acquires the information issued by the work attachment and the information thus acquired includes identification information identifying the work attachment attached to the attachment mount portion, select one of the pieces of operation characteristics information that corresponds to the work attachment identified by the identification information included in the information acquired by the information acquirer; and based on the selected one of the pieces of operation characteristics information, control the speed of switching of the work-attachment-drive control valve when starting the work attachment and/or when stopping the work attachment.

6. The working machine according to claim 5, wherein the identification information identifying the work attachment includes information about a type, a specification, and/or optional equipment of the work attachment.

7. The working machine according to claim 1, further comprising:

an information acquirer to, when the work attachment attached to the attachment mount portion issues information, acquire the information, wherein the controller is configured or programmed to, when the information acquirer acquires the information issued by the work attachment and the information thus acquired includes another piece of operation characteristics information that corresponds to the work attachment attached to the attachment mount portion and that includes information relating to the speed of switching of the work-attachment-drive control valve other than the pieces of operation characteristics information stored in the memory, control, based on the another piece of operation characteristics information included in the information acquired by the information acquirer, the speed of switching of the work-attachment-drive control valve when starting the work attachment and/or when stopping the work attachment.

8. The working machine according to claim 7, wherein the controller is configured or programmed to control the speed of switching of the work-attachment-drive control valve when starting the work attachment and/or when stopping the work attachment based on the another piece of operation characteristics information included in the information acquired by the information acquirer with higher priority than the pieces of operation characteristics information stored in the memory.

9. The working machine according to claim 1, wherein the controller is configured or programmed to control, in a case where a centrifugal force around the rotation axis of the hydraulic motor is required when the hydraulic motor of the work attachment starts, control the work-attachment-drive control valve to operate at the first speed when starting the work attachment.

10. A working machine comprising:

an attachment mount portion including a hydraulic fluid port;

a work-attachment-drive hydraulic circuit to supply hydraulic fluid to a work attachment attached to the attachment mount portion and fluidly connected to the hydraulic fluid port, the work attachment including a hydraulic motor capable of rotating around a rotation axis;

a work-attachment-drive control valve to:

control a flow rate of hydraulic fluid supplied via the work-attachment-drive hydraulic circuit to the work attachment;

change a degree of opening of one or more ports thereof that are in communication with the work-attachment-drive hydraulic circuit by movement of a spool thereof; and change a speed of switching of the work-attachment-drive control valve, the speed of switching being a speed of movement of the spool;

a memory to store pieces of operation characteristics information corresponding to respective work attachments each for use as the work attachment attached to the attachment mount portion and fluidly connected to the hydraulic fluid port, the pieces of operation characteristics information each including information relating to the speed of switching of the work-attachment-drive control valve; and a controller to select one of the pieces of operation characteristics information corresponding to the respective work attachments stored in the memory that corresponds to the work attachment attached to the attachment mount portion and fluidly connected to the hydraulic fluid port; and control, based on the selected one of the pieces of operation characteristics information, the speed of switching of the work-attachment-drive control valve when starting the work attachment and/or when stopping the work attachment, wherein the information relating to the speed of switching of the work-attachment-drive control valve includes information relating to selection of whether to cause the work attachment fluidly connected to the hydraulic fluid port to operate at a first speed or a second speed slower than the first speed; and the controller is configured or programmed to control, in a case where a centrifugal force around the rotation axis of the hydraulic motor is required when the hydraulic motor of the work attachment starts, control the work-attachment-drive control valve to operate at the first speed when starting the work attachment.

11. The working machine according to claim 10, wherein the controller is configured or programmed to control, in a case where a centrifugal force around the rotation axis of the hydraulic motor is required when the hydraulic motor of the work attachment stops, control the work-attachment-drive control valve to operate at the first speed when stopping the work attachment.

* * * * *